(12) United States Patent
Ryu et al.

(10) Patent No.: US 11,454,428 B2
(45) Date of Patent: Sep. 27, 2022

(54) AIR CONDITIONER

(71) Applicant: LG ELECTRONICS INC., Seoul (KR)

(72) Inventors: Byoungjin Ryu, Seoul (KR); Sangil Park, Seoul (KR); Yoonho Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 136 days.

(21) Appl. No.: 16/748,949

(22) Filed: Jan. 22, 2020

(65) Prior Publication Data

US 2020/0240681 A1 Jul. 30, 2020

(30) Foreign Application Priority Data

Jan. 25, 2019 (KR) .................. 10-2019-0009712

(51) Int. Cl.
*F25B 13/00* (2006.01)
*F25B 41/34* (2021.01)
(Continued)

(52) U.S. Cl.
CPC .............. *F25B 13/00* (2013.01); *F25B 41/20* (2021.01); *F25B 41/24* (2021.01); *F25B 41/34* (2021.01);
(Continued)

(58) Field of Classification Search
CPC ................ F25B 41/24; F25B 2313/009; F25B 2313/0231; F25B 2313/0272; F25B 13/00;
(Continued)

(56) References Cited

U.S. PATENT DOCUMENTS

2004/0093893 A1* 5/2004 Tanimoto .............. F25B 49/025
62/510
2017/0135499 A1* 5/2017 Heinzle ................. A47F 3/0447
(Continued)

FOREIGN PATENT DOCUMENTS

EP 1 445 556 8/2004
EP 3 521 716 8/2019
(Continued)

OTHER PUBLICATIONS

WO2018061188A1 Indoor Unit and Air Conditioner, Tashiro et al., Apr. 2018 (Year: 2018).*
(Continued)

*Primary Examiner* — Larry L Furdge
(74) *Attorney, Agent, or Firm* — Ked & Associates

(57) ABSTRACT

An air conditioner including an outdoor unit, an air conditioning indoor unit, a showcase indoor unit, and a combination unit. The combination unit includes a first gas control unit connected to the air conditioning indoor unit gas pipe, a second gas control unit connected to the showcase indoor unit gas pipe, a first pipe which connects the outdoor unit liquid pipe and the indoor unit liquid pipe, and a second pipe which connects the first pipe and the second gas control unit. The first gas control unit and the second gas control unit are converged to be connected to the outdoor unit gas pipe, so that the air conditioning indoor unit and the showcase indoor unit can use a single outdoor unit, and heat emitted from the air conditioning indoor unit to a room during a heating operation is used as condensation heat of the showcase indoor unit.

16 Claims, 7 Drawing Sheets

(51) Int. Cl.
  *F25B 41/20*  (2021.01)
  *F25B 41/24*  (2021.01)
  *F25B 41/385*  (2021.01)

(52) U.S. Cl.
  CPC ....... *F25B 41/385* (2021.01); *F25B 2313/006* (2013.01); *F25B 2313/0233* (2013.01); *F25B 2313/02741* (2013.01)

(58) Field of Classification Search
  CPC ........ F25B 41/20; F25B 41/34; F25B 41/385; F25B 2313/006; F25B 2313/0233; F25B 2313/02741; F25B 2313/02331; F25B 2313/02332; F25B 2313/0334; F25B 2313/02341; F25B 2313/02342; F25B 2313/02344; F25B 5/02; F24F 5/001; F25D 19/00
  See application file for complete search history.

(56) References Cited

U.S. PATENT DOCUMENTS

| 2017/0135500 | A1* | 5/2017 | Evers | A47F 3/007 |
| 2017/0292770 | A1* | 10/2017 | Fowler | A47F 3/0447 |
| 2018/0084925 | A1* | 3/2018 | Rajagopalan | A47F 3/007 |

FOREIGN PATENT DOCUMENTS

| WO | WO 2018/061188 | 4/2018 | |
| WO | WO-2018061188 A1 * | 4/2018 | F24F 11/84 |

OTHER PUBLICATIONS

European Search Report dated May 27, 2020 issued in Application No. 20153549.9.

* cited by examiner

AIR CONDITIONER

CROSS-REFERENCE TO RELATED PATENT APPLICATIONS

This application claims priority benefit of Korean Application No. 10-2019-0009712 filed on Jan. 25, 2019, whose entire disclosure is hereby incorporated by reference.

BACKGROUND OF THE INVENTION

1. Field of the Invention

The present disclosure relates to an air conditioner, and more particularly, to an air conditioner including an indoor unit for indoor air conditioning and an indoor unit for showcase refrigeration.

2. Description of the Related Art

A refrigeration cycle generally means a cycle of supplying heat to a place that needs heat or absorbing heat by using a circulation cycle of a refrigerant. A compressor, a condenser, an expansion valve, and an evaporator are used to implement such a refrigeration cycle.

An apparatus or system for heating or cooling indoor air using such a refrigeration cycle is called an air conditioner. The air conditioner may cool or heat the indoor air by providing the heat of the refrigerant to the indoor air or by taking the heat of the indoor air into the refrigerant.

Meanwhile, among apparatuses using the operating mechanism of the air conditioner, there is a showcase for maintaining the low temperature of food. The showcase is installed in a sales place and maintains the freshness of the product by discharging cold air for 24 hours.

The showcase is mainly an open showcase that has an opened front surface so as to expose cold goods to customers. In such an open showcase, cold air leaks through the opened surface, and the indoor temperature of the sales place may serve as a load of the showcase.

In a conventional air conditioner, the outdoor unit for indoor air conditioning and the outdoor unit for food refrigeration are separately configured. Accordingly, there is a problem in that excessive cost is required for installing the indoor air conditioner and the refrigeration showcase.

In addition, in such a conventional air conditioner, in the winter season and in the change of seasons that requires heating, the cold air leaked from the showcase increases the heating load of the indoor air conditioner, and a part of the energy applied to the indoor air conditioner for heating is absorbed in the showcase to increase the refrigeration load. Accordingly, there is a problem in that a vicious cycle of energy flow occurs.

In addition, even if only the showcase for refrigeration is operated during the season that requires cooling, the indoor temperature may be lowered due to the leakage of cold air from the showcase, and user does not feel the necessity of the operation of the indoor air conditioning equipment, and thus, often, does not operate the indoor air conditioning equipment. In this case, the indoor cooling load is removed by using the showcase. The evaporation temperature of the showcase refrigeration cycle is excessively low in comparison with the indoor temperature to inefficiently cool, and operation in an overload state has a problem in that the durability of the showcase equipment decreases together with energy loss.

SUMMARY OF THE INVENTION

The present disclosure has been made in view of the above problems, and provides an air conditioner that employs a single outdoor unit used for indoor air conditioning equipment capable of performing cooling and heating operations, and showcase refrigeration equipment capable of performing refrigeration operation.

The present disclosure further provides an air conditioner that utilizes the amount of heat emitted from the air conditioning indoor unit to the room, during heating operation of the indoor air conditioner, as the heat of condensation of the showcase equipment to zero the energy consumption for heating.

The present disclosure further provides an air conditioner that uses a single outdoor unit for cooling operation of an indoor air conditioner, and can differently configure the evaporation temperature of an indoor unit for indoor cooling and the evaporation temperature of an indoor unit for showcase refrigeration.

In accordance with an aspect of the present disclosure, an air conditioner includes: an outdoor unit installed outdoors to exchange heat between an outdoor air and a refrigerant, an indoor unit for controlling a temperature of a showcase disposed inside the room and having a storage compartment therein, and a combination unit disposed between the outdoor unit and the indoor unit for connecting the outdoor unit and the indoor unit The outdoor unit includes a compressor which compresses a refrigerant, an outdoor heat exchanger which exchanges outdoor air with the refrigerant, an outdoor unit gas pipe which is connected to the compressor, an outdoor unit liquid pipe which is connected to the outdoor heat exchanger, and a four-way valve which selectively guides the refrigerant discharged from the compressor to the outdoor heat exchanger or the outdoor unit gas pipe.

The indoor unit includes an air conditioning indoor unit which controls a temperature of a room, a showcase indoor unit which is disposed inside the room and supplies cold air to a showcase having a storage compartment therein, an air conditioning indoor unit gas pipe which is connected to one end of the air conditioning indoor unit, a showcase indoor unit gas pipe which is connected to one end of the showcase indoor unit, and an indoor unit liquid pipe which is connected to the other ends of the air conditioning indoor unit and the showcase indoor unit.

The combination unit includes a first gas control unit which is connected to the air conditioning indoor unit gas pipe, a second gas control unit which is connected to the showcase indoor unit gas pipe, a first pipe which connects the outdoor unit liquid pipe and the indoor unit liquid pipe, and a second pipe which connects the first pipe and the second gas control unit.

The first gas control unit and the second gas control unit are converged to be connected to the outdoor unit gas pipe.

The air conditioning indoor unit includes: an air conditioning heat exchanger which exchanges heat between an indoor air and the refrigerant; and a first indoor expansion valve which is disposed between the air conditioning heat exchanger and the indoor unit liquid pipe and expands the refrigerant introduced into the air conditioning heat exchanger during a cooling operation.

The showcase indoor unit includes: a showcase heat exchanger which exchanges heat between the air in the storage compartment and the refrigerant; and a second indoor expansion valve which expands the refrigerant flowing into the showcase heat exchanger during a refrigeration operation.

The four-way valve connects an outlet flow path of the compressor and the outdoor heat exchanger, and connects an inlet flow path of the compressor and the outdoor unit gas pipe, in the cooling operation of the air conditioning indoor unit and the refrigeration operation of the showcase indoor unit, and connects the outlet flow path of the compressor and the outdoor unit gas pipe, and connects the inlet flow path of the compressor and the outdoor heat exchanger, in a heating operation of the air conditioning indoor unit and/or a defrost operation of the showcase indoor unit.

The combination unit includes: a first pipe check valve which is installed in the first pipe, and blocks a flow of the refrigerant introduced from the indoor unit liquid pipe; and a first combination expansion valve which is installed in the first pipe, connected in parallel with the first pipe check valve, and expands the refrigerant introduced from the indoor unit liquid pipe.

The first combination expansion valve is closed, in the cooling operation of the air conditioning indoor unit and the refrigeration operation of the showcase indoor unit, and expands the refrigerant flowing through the first pipe by adjusting an opening degree, in a defrost operation of the air conditioning indoor unit and/or a defrost operation of the showcase indoor unit.

The combination unit includes: a second combination expansion valve which is installed in the second pipe and expands the refrigerant introduced into the second pipe from the second gas control unit; and a second pipe check valve which is installed in the second pipe and blocks a flow of the refrigerant from the outdoor unit liquid pipe toward the second pipe.

The first gas control unit includes: a high pressure flow path through which the refrigerant discharged from the compressor flows in a heating operation of the air conditioning indoor unit; and a first low pressure flow path which is connected in parallel with the high pressure flow path, and flows the refrigerant discharged from the air conditioning indoor unit in a cooling operation of the air conditioning indoor unit.

The second gas control unit includes: a second low pressure flow path through which the refrigerant discharged from the showcase indoor unit flows in a refrigeration operation of the showcase indoor unit; and a connection flow path connecting the second low pressure flow path and the second pipe.

The combination unit includes a converging flow path which is extended from the first low pressure flow path and the second low pressure flow path respectively, and converged with each other to be connected to the outdoor unit gas pipe.

The first gas control unit includes: a high pressure solenoid valve which is installed in the high pressure flow path and controls a flow of the refrigerant flowing through the high pressure flow path; a low pressure expansion valve which is installed in the first low pressure flow path and expands the refrigerant flowing through the first low pressure flow path; and a first low pressure check valve which is installed in the first low pressure flow path and blocks a flow from the converging flow path toward the first low pressure flow path.

The second gas control unit includes a second low pressure check valve which is installed in the second low pressure flow path and blocks a refrigerant flow from the converging flow path toward the second low pressure flow path.

The high pressure solenoid valve is opened in the heating operation of the air conditioning indoor unit.

The first gas control unit includes a high pressure check valve which is installed in the high pressure flow path and blocks a flow from the air conditioning indoor unit gas pipe to the high pressure flow path.

The second pipe connects the first pipe with the first gas control unit and the second gas control unit.

The first gas control unit includes: a first high pressure flow path through which the refrigerant discharged from the compressor flows in a heating operation of the air conditioning indoor unit; a first low pressure flow path which is connected in parallel with the first high pressure flow path and through which the refrigerant discharged from the air conditioning indoor unit flows in a cooling operation of the air conditioning indoor unit; and a first connection flow path connecting the first low pressure flow path and the second pipe.

The second gas control unit includes: a second high pressure flow path through which he refrigerant discharged from the compressor flows in a defrosting operation of the showcase indoor unit; a second low pressure flow path connected in parallel with the second high pressure flow path, and through which the refrigerant discharged from the showcase indoor unit flows in a refrigeration operation of the showcase indoor unit; and a second connection flow path connecting the second low pressure flow path and the second pipe.

The combination unit includes a converging flow path which is extended from the first low pressure flow path and the second low pressure flow path respectively, and converged with each other to be connected to the outdoor unit gas pipe.

The first gas control unit includes: a first high pressure solenoid valve which is installed in the first high pressure flow path and controls a flow of the refrigerant flowing through the first high pressure flow path; a low pressure expansion valve which is installed in the first low pressure flow path and expands a refrigerant flowing through the first low pressure flow path; a first low pressure check valve which is installed in the first low pressure flow path and blocks a flow from the converging flow path toward the first low pressure flow path; and a first connection solenoid valve which is installed in the first connection flow path and controls a flow of the refrigerant flowing through the first connection flow path.

The second gas control unit includes: a second high pressure solenoid valve which is installed in the second high pressure flow path and controls a flow of the refrigerant flowing through the second high pressure flow path; a second low pressure check valve which is installed in the second low pressure flow path and blocks a refrigerant flow from the converging flow path toward the second low pressure flow path; and a second connection solenoid valve which is installed in the second connection flow path and controls a flow of the refrigerant flowing through the second connection flow path.

The first high pressure solenoid valve is opened in the heating operation of the air conditioning indoor unit, and is closed in the cooling operation of the air conditioning indoor unit the defrost operation of the showcase indoor unit, and the second high pressure solenoid valve is opened in the defrosting operation of the showcase indoor unit, and is closed in the cooling operation of the showcase indoor unit and the heating operation of the air conditioning indoor unit.

The first connection solenoid valve is closed in the heating operation of the air conditioning indoor unit, and is opened in the cooling operation of the air conditioning indoor unit and the defrosting operation of the showcase indoor unit.

The second connection solenoid valve is closed in the defrosting operation of the showcase indoor unit, and is opened in the cooling operation of the showcase indoor unit and the heating operation of the air conditioning indoor unit.

The first gas control unit includes first high pressure check valve which is installed in the first high pressure flow path and blocks a flow from the air conditioning indoor unit gas pipe toward the first high pressure flow path, and the second gas control unit includes a second high pressure check valve which is installed in the second high pressure flow path and blocks a flow from the showcase indoor unit gas pipe to the second high pressure flow path.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION OF THE PREFERRED EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Hereinafter, the present disclosure will be described with reference to the drawings for explaining an air conditioner according to embodiments of the present disclosure.

Figure 1:
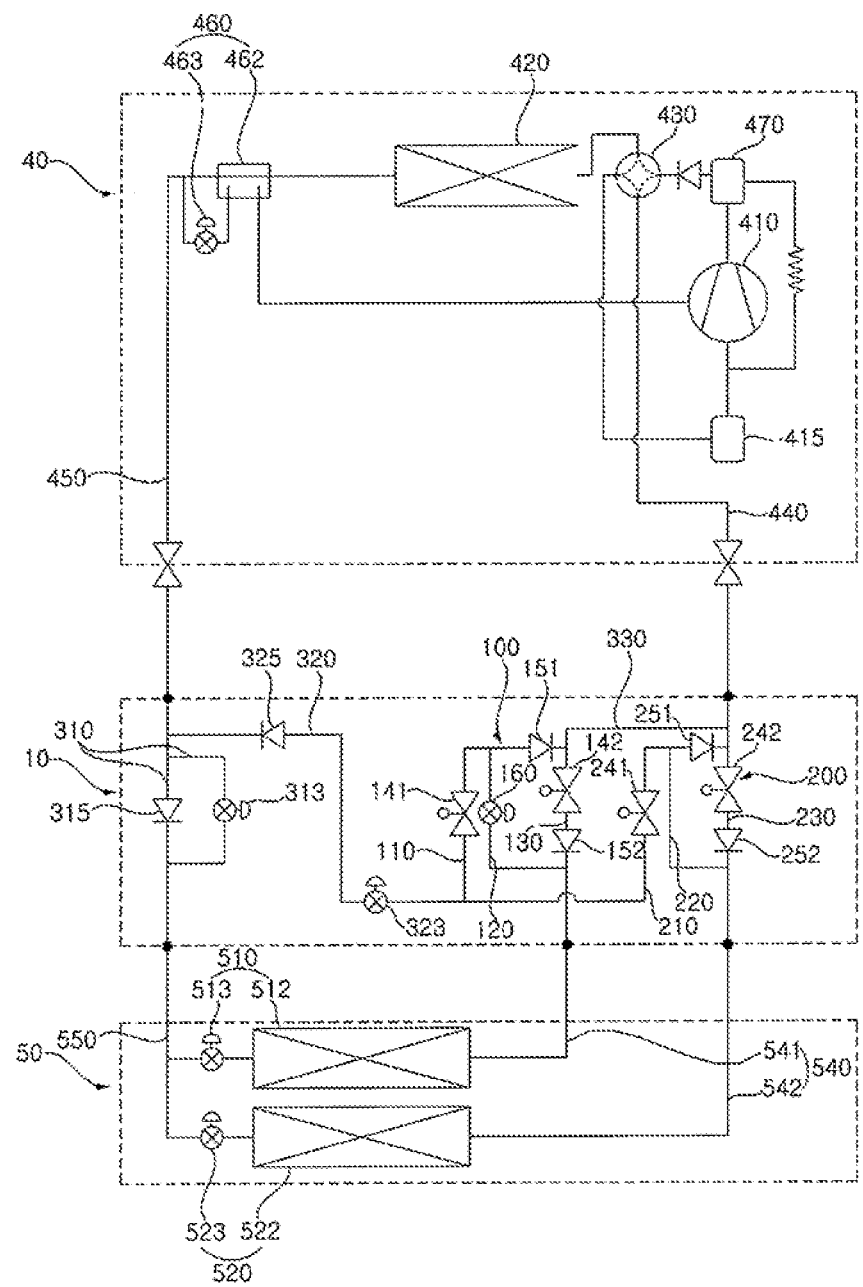
FIG. 1 is a configuration diagram of an air conditioner according to an embodiment of the present disclosure.

FIG. 1 is a configuration diagram of an air conditioner according to an embodiment of the present disclosure.

Referring to FIG. 1, an air conditioner according to an embodiment of the present disclosure includes an outdoor unit 40 which is installed outdoors and heat-exchanges the outdoor air with a refrigerant, an indoor unit 50 which controls a temperature of a room and a showcase (not shown) that is disposed inside the room and has a storage compartment therein, and a combination unit 10 which is disposed between the outdoor unit 40 and the indoor unit 50 and connects the outdoor unit 40 and the indoor unit 50.

Meanwhile, the air conditioner according to an embodiment of the present disclosure may include a controller 60 (see FIG. 7) for controlling the air conditioner. Hereinafter, it can be understood that operations of a four-way valve 430, a solenoid valve 141, 142, 241, and 242, an expansion valve 160, 313, 323, 463, 513, and 523 described below are controlled by a controller 60.

An air conditioner according to an embodiment of the present disclosure may be an air conditioner that adjusts a temperature of a sales place (indoor), and provides cold air to a showcase disposed in the sales place (indoor).

The showcase is an apparatus for freshly storing food and the like. The showcase is usually placed in the sales place. The sales place may be a mart, a convenience store, etc., which sells fresh food to consumers. The showcase should maintain the freshness of the product by supplying a certain amount of cold air even when the business hours are over, and for this purpose, the showcase is generally operated continuously for 24 hours.

The showcase may be disposed indoors, and has a storage compartment for storing and displaying foods therein. The showcase may have a front surface that is opened so as to expose the displayed food to the consumer, and to provide convenience of the consumer's choice.

Referring to FIG. 1, the indoor unit 50 of the air conditioner according to an embodiment of the present disclosure includes an air conditioning indoor unit 510 for controlling the temperature of the room, and a showcase indoor unit 520 which is disposed in the room and supplies cold air to a showcase having a storage compartment therein.

The air conditioning indoor unit 510 is installed indoors, and may control the indoor temperature through heat exchange between the refrigerant and the indoor air. The air conditioning indoor unit 510 may be an indoor unit capable of switching between a cooling operation and a heating operation.

The air conditioning indoor unit 510 may include an air conditioning heat exchanger 512 for exchanging indoor air and a refrigerant. During the cooling operation of the air conditioning indoor unit 510, the air conditioning heat exchanger 512 serves as an evaporator, and the refrigerant flowing through the air conditioning heat exchanger 512 may absorb heat from indoor air. During the heating operation of the air conditioning indoor unit 510, the air conditioning heat exchanger 512 serves as a condenser, and the refrigerant flowing through the air conditioning heat exchanger 512 may emit heat to indoor air.

The showcase indoor unit 520 may be installed in the showcase, and adjust the temperature of the storage compartment provided in the showcase through heat exchange between the refrigerant and the air in the showcase. The showcase is generally maintained cold, and the showcase indoor unit 520 supplies cold air to the showcase. The showcase indoor unit 520 may be an indoor unit capable of switching between the refrigeration operation and the defrost operation.

The showcase indoor unit 520 may include a showcase heat exchanger 522 that exchanges heat of a refrigerant with the air in the storage compartment of the showcase. During the refrigeration operation of the showcase indoor unit 520, the showcase heat exchanger 522 may serve as an evaporator, and the refrigerant flowing through the showcase heat exchanger 522 may absorb heat from indoor air and provide cold air to the showcase. During the defrosting operation of the showcase indoor unit 520, the showcase heat exchanger 522 may serve as a condenser, and the refrigerant flowing through the showcase heat exchanger 522 may emit heat to remove frost formed in the showcase heat exchanger 522.

Detailed description of the indoor unit 50 will be described later.

Referring to FIG. 1, an outdoor unit 40 of an air conditioner according to an embodiment of the present disclosure includes a compressor 410 for compressing a refrigerant, and an outdoor heat exchanger 420 for exchanging outdoor air with the refrigerant. The outdoor unit 40 includes an outdoor unit gas pipe 440 connected to the compressor 410, an outdoor unit liquid pipe 450 connected to the outdoor heat exchanger 420, and a four-way valve 430 which selectively guides the refrigerant discharged from the compressor 410 to the outdoor heat exchanger 420 or to the outdoor unit gas pipe 440.

The compressor 410 compresses a low temperature, low pressure vapor refrigerant introduced through the inlet flow path of the compressor 410 into a high temperature, high pressure vapor refrigerant. As described below, the inlet flow path of the compressor 410 may be connected to an accumulator 415, and the outlet flow path of the compressor 410 may be connected to an oil separator 470.

The outdoor heat exchanger 420 may be connected to the outlet flow path of the compressor 410 or may be connected to the inlet flow path of the compressor. The outdoor heat exchanger 420 may be connected to the outlet flow path of the compressor 410 to serve as a condenser, or may be connected to the outlet flow path of the compressor 410 to serve as an evaporator, according to the operation mode of the indoor unit 50.

The outdoor heat exchanger 420 may be connected to the outlet flow path of the compressor 410 to serve as a condenser during the cooling operation of the air conditioning indoor unit 510 and the refrigeration operation of the showcase indoor unit 520. In addition, the outdoor heat exchanger 420 may serve as an evaporator during the stop of the air conditioning indoor unit 510 and the refrigeration operation of the showcase indoor unit 520.

The outdoor heat exchanger 420 may serve as an evaporator during the heating operation of the air conditioning indoor unit 510, and may serve as an evaporator during the defrost operation of the showcase indoor unit 520. The outdoor heat exchanger 420 may serve as an evaporator regardless of the operation mode of the showcase indoor unit 520 during the heating operation of the air conditioning indoor unit 510, and serve as an evaporator regardless of the operation mode of the air conditioning indoor unit 510 during the defrosting operation of the showcase indoor unit 520. That is, the outdoor heat exchanger 420 may serve as an evaporator during the heating operation of the air conditioning indoor unit 510 and/or the defrosting operation of the showcase indoor unit 520.

The outdoor unit 40 may include a pair of refrigerant pipes 440 and 450. The pair of refrigerant pipes 440 and 450 may include an outdoor unit gas pipe 440 through which a vapor refrigerant or a high dry two-phase refrigerant flows, and an outdoor unit liquid pipe 450 through which a liquid refrigerant or a low dry two-phase refrigerant flows.

The outdoor unit gas pipe 440 may be connected to an indoor unit gas pipe 540 through a gas control unit 100, 200 of the combination unit 10. The outdoor unit gas pipe 440 may be connected to the inlet flow path of the compressor 410 according to the operation mode of the indoor unit to guide the low-temperature low-pressure vapor refrigerant to the compressor 410, or may be connected to the outlet flow path of the compressor 410 to guide the high temperature, high pressure vapor refrigerant discharged from the compressor 410 to the gas control unit 100, 200 of the combination unit 10.

The outdoor unit liquid pipe 450 may be connected to an indoor unit liquid pipe 550 through a first pipe 310 of the combination unit 10. The outdoor unit liquid pipe 450 may be connected to the outdoor heat exchanger 420. When the outdoor heat exchanger 420 serves as a condenser, the outdoor unit liquid pipe 450 may guide the high temperature, high pressure liquid refrigerant discharged from the outdoor heat exchanger 420 to the first pipe 310. When the outdoor heat exchanger 420 serves as an evaporator, the low-temperature, low-pressure two-phase refrigerant may be guided to the outdoor heat exchanger 420.

The outdoor unit gas pipe 440 may flow a vapor refrigerant or a high dry two-phase refrigerant, and the outdoor unit liquid pipe 450 may include a liquid refrigerant or a low dry two-phase refrigerant The four-way valve 430 selectively guides the refrigerant discharged from the compressor 410 to the outdoor heat exchanger 420 or the outdoor unit gas pipe 440, and the refrigerant guided to the outdoor unit gas pipe 440 is guided to the indoor unit 50 through the gas control unit 100, 200 and the indoor unit gas pipe 541, 542. The four-way valve 430 may be connected to the outlet flow path of the compressor 410, the outdoor heat exchanger 420, the outdoor unit gas pipe 440, and the inlet flow path of the compressor 410.

In the cooling operation of the air conditioning indoor unit 510 and the refrigeration operation of the showcase indoor unit 520, the four-way valve 430 may connect the outlet flow path of the compressor 410 and the outdoor heat exchanger 420 to guide the refrigerant discharged from the compressor 410 to the outdoor heat exchanger 420, and connect the gas pipe 440 of the outdoor unit and the inlet flow path of the compressor 410 to guide the refrigerant introduced into the outdoor unit 40 to the compressor 410. The four-way valve 430 may connect the outlet flow path of the compressor 410 and the outdoor heat exchanger 420 even when the air conditioning indoor unit 510 is stopped and the refrigeration operation of the showcase indoor unit 520 is performed.

In the heating operation of the air conditioning indoor unit 510 and/or the defrosting operation of the showcase indoor unit 520, the four-way valve 430 may connect the outlet flow path of the compressor 410 and the gas pipe 440 of the outdoor unit to guide the refrigerant discharged from the compressor 410 to the gas pipe 440 of the outdoor unit, and connect the outdoor heat exchanger 420 and the inlet flow path of the compressor 410 to guide the refrigerant discharged from the outdoor heat exchanger 420 to the compressor 410.

The air conditioner according to an embodiment of the present disclosure may include a controller 60, and the controller 60 may control the four-way valve 430 to switch the refrigerant flow path. In the cooling operation of the air conditioning indoor unit 510 and the refrigeration operation of the showcase indoor unit 520, the four-way valve 430 may connect the outlet flow path of the compressor 410 and the outdoor heat exchanger 420 under the control of the controller 60, and may connect the inlet flow path of the compressor 410 and the outdoor unit gas pipe 440. In the heating operation of the air conditioning indoor unit 510 and/or the defrost operation of the showcase indoor unit 520, the four-way valve 430 may connect the outlet flow path of the compressor 410 and the outdoor unit gas pipe 440 under the control of the controller 60, and may connect the inlet flow path of the compressor 410 and the outdoor heat exchanger 420.

Meanwhile, the outdoor unit 40 may further include an accumulator 415 which is disposed between the four-way valve 430 and the inlet flow path of the compressor 410 and provides a vapor refrigerant to the compressor 410, a supercooler 460 for supercooling the refrigerant discharged from the outdoor heat exchanger 420, and an oil separator 470 for separating oil from the refrigerant discharged from the compressor 410. In addition, the outdoor unit 40 may further include an outdoor blower fan (not shown) disposed in one side of the outdoor heat exchanger 420, and the outdoor blower fan may improve the heat exchange performance of the outdoor heat exchanger 420 by flowing an outdoor air.

The accumulator 415 may be installed between the inlet flow path of the compressor 410 and the four-way valve 430. The refrigerant discharged from the air conditioning indoor unit 510, the showcase indoor unit 520, or the outdoor heat exchanger 420 and flowing toward the inlet flow path of the compressor 410 may not reach a saturated liquid state, and may be a two-phase liquid-vapor state. The accumulator 415 may be disposed upstream of the compressor 410, be connected to the inlet flow path of the compressor 410 to separate the two-phase refrigerant into vapor state and liquid state refrigerants, and supply the vapor state refrigerant to the compressor 410.

The oil separator 470 may be installed between the outlet flow path of the compressor 410 and the four-way valve 430. The oil separator 470 may separate oil from the compressed refrigerant discharged from the compressor 410, guide the refrigerant to the four-way valve 430, and guide the oil to the inlet flow path of the compressor 410.

The supercooler 460 may be installed between the outdoor heat exchanger 420 and the outdoor unit liquid pipe 450. The supercooler 460 may supercool the refrigerant condensed by the outdoor heat exchanger 420, when the outdoor heat exchanger 420 serves as a condenser. The supercooler 460 may include a supercooling heat exchanger 462 and a supercooling expansion valve 463.

The refrigerant discharged from the outdoor heat exchanger 420 flows into the supercooling heat exchanger 462, a part of the refrigerant flowing into the supercooling heat exchanger 462 flows along the outdoor unit liquid pipe 450, and the remaining part of the refrigerant may be expanded while passing through the supercooling expansion valve 463. The refrigerant which is discharged from the outdoor heat exchanger 420 and introduced into the supercooling heat exchanger 462, and the refrigerant that is expanded while passing through the supercooling expansion valve 463 may heat-exchange with each other. The refrigerant which is discharged from the outdoor heat exchanger 420 and introduced into the heat exchanger 462 may be supercooled, and the refrigerant which is discharged from the supercooling expansion valve 463 and introduced into the supercooling heat exchanger 462 may be introduced into an intermediate pressure stage of the compressor 410 after heat exchange.

Referring to FIG. 1, the indoor unit 50 of an air conditioner according to the embodiment of the present disclosure includes the above-described air conditioning indoor unit 510 and the showcase indoor unit 520. In addition, the indoor unit 50 includes an air conditioning indoor unit gas pipe 541 connected to one end of the air conditioning indoor unit 510, a showcase indoor unit gas pipe 542 connected to one end of the showcase indoor unit 520, and an indoor unit liquid pipe 550 connected to the other ends of the air conditioning indoor unit 510 and the showcase indoor unit 520.

One end of the air conditioning indoor unit 510 is connected to the air conditioning indoor unit gas pipe 541, and the other end is connected to the indoor unit liquid pipe 550. One end of the showcase indoor unit 520 is connected to the showcase indoor unit gas pipe 542, and the other end is connected to the indoor unit liquid pipe 550.

The air conditioning indoor unit gas pipe 541 may be connected to one end of the air conditioning heat exchanger 512, and may be connected to a first gas control unit 100 described later. The air conditioning indoor unit gas pipe 541 may connect the air conditioning heat exchanger 512 and the first gas control unit 100.

The showcase indoor unit gas pipe 542 may be connected to one end of the showcase heat exchanger 522 and may be connected to a second gas control unit 200 described later. The showcase indoor unit gas pipe 542 may connect the showcase heat exchanger 522 and the second gas control unit 200.

The indoor unit liquid pipe 550 is connected to the first pipe 310 of the combination unit 10, branched into two flow paths, and connected respectively to the air conditioning indoor unit 510 and the showcase indoor unit 520. First and second indoor expansion valves 513 and 523 may be installed respectively in two flow paths that are branched from the indoor unit liquid pipe 550 and connected to the indoor unit 50.

Therefore, the indoor unit 50 and the combination unit 10 may be connected through a single liquid pipe 550 and two gas pipes 541 and 542. The combination unit 10 may be installed closer to the indoor unit 50 side than the outdoor unit 40 side, and the outdoor unit 40 and the combination unit 10 may be connected by two pipes configured of a single liquid pipe 450 and a single gas pipe 440. Accordingly, the required number of pipes can be reduced in comparison with a conventional air conditioner in which the indoor air conditioning equipment and the showcase refrigeration equipment have their own outdoor unit respectively.

In the air conditioning indoor unit gas pipe 541 and the showcase indoor unit gas pipe 542, a refrigerant in a vapor state or a high-dry two-phase state refrigerant may flow. A refrigerant in a liquid state or a low-dry two-phase state refrigerant may flow in the indoor unit liquid pipe 550.

The air conditioning indoor unit 510 may include an air conditioning heat exchanger 512 for heat-exchanging between the indoor air and the refrigerant, and a first indoor expansion valve 513 which is disposed between the air conditioning heat exchanger 512 and the indoor unit liquid pipe 550 and expands the refrigerant flowing into the air conditioning heat exchanger 512 during the cooling operation.

One end of the air conditioning heat exchanger 512 is connected to the air conditioning indoor unit gas pipe 541, and the air conditioning indoor unit gas pipe 541 is connected to the first gas control unit 100. The other end of the air conditioning heat exchanger 512 is connected to the first indoor expansion valve 513, and the first indoor expansion valve 513 is connected to the indoor unit liquid pipe 550.

In the cooling operation of the air conditioning indoor unit 510, the air conditioning heat exchanger 512 heat-exchanges the refrigerant introduced in a two-phase state of low temperature and low pressure with the indoor air to evaporate into a vapor state of low temperature and low pressure.

In the heating operation of the air conditioning indoor unit 510, the air conditioning heat exchanger 512 heat-exchanges the refrigerant introduced in a vapor state of high temperature and high pressure with the indoor air to condense into a liquid state of high temperature and high pressure.

In the cooling operation of the air conditioning indoor unit 510, the first indoor expansion valve 513 may adjust the opening degree to expand the condensed refrigerant of high temperature and high pressure into a two-phase state of low temperature and low pressure, and guide the refrigerant to the air conditioning heat exchanger 512. In the heating operation of the air conditioning indoor unit 510, the first indoor expansion valve 513 may be completely opened to guide the refrigerant discharged from the air conditioning heat exchanger 512 to the indoor unit liquid pipe 550 without a pressure drop.

When the air conditioning indoor unit 510 is stopped, the first indoor expansion valve 513 is closed to block the refrigerant flow from the indoor unit liquid pipe 550 toward the air conditioning heat exchanger 512.

In the cooling operation of the air conditioning indoor unit 510, the refrigerant introduced into the air conditioning indoor unit 510 from the indoor unit liquid pipe 550 is expanded through the first indoor expansion valve 513, evaporated in the air conditioning heat exchanger 512, and is discharged to the combination unit 10 through the aft conditioning indoor unit gas pipe 641.

The refrigerant introduced into the air conditioning indoor unit 510 from the air conditioning indoor unit gas pipe 541 during the heating operation of the air conditioning indoor unit 510 is condensed in the air conditioning heat exchanger 512 and flows toward the indoor unit liquid pipe 550.

The showcase indoor unit 520 may include a showcase heat exchanger 522 for heat-exchanging the refrigerant with the air in the storage compartment of the showcase, and a second indoor expansion valve 523 for expanding the refrigerant introduced into the showcase heat exchanger 522 during the refrigeration operation.

One end of the showcase heat exchanger 522 is connected to the showcase indoor unit gas pipe 542, and the showcase indoor unit gas pipe 542 is connected to the second gas control unit 200. The other end of the showcase heat exchanger 522 is connected to the second indoor expansion valve 523, and the second indoor expansion valve 523 is connected to the indoor unit liquid pipe 550.

In the refrigeration operation of the showcase indoor unit 520, the showcase heat exchanger 522 heat-exchanges the air in the showcase with the refrigerant introduced in the two-phase state of low temperature and low pressure to evaporate into a low temperature and low pressure vapor state. In the defrosting operation, the showcase heat exchanger 522 heat-exchanges the refrigerant introduced in the vapor state of high temperature and high pressure with the frost formed in the showcase to condense into a liquid state of high temperature and high pressure.

The second indoor expansion valve 523 may adjust the opening degree during the refrigeration operation of the showcase indoor unit 520 to expand the condensed refrigerant of high temperature and high pressure into a two-phase state of low temperature and low pressure, and guide the refrigerant to the showcase heat exchanger 522. In the defrosting operation of the showcase indoor unit 520, the second indoor expansion valve 523 may be completely opened to guide the refrigerant discharged from the showcase heat exchanger 522 to the indoor unit liquid pipe 550 without a pressure drop.

In the refrigeration operation of the showcase indoor unit 520, the refrigerant introduced into the showcase indoor unit from the indoor unit liquid pipe 550 is expanded through the second indoor expansion valve 523, evaporated in the showcase heat exchanger 522, and is discharged to the combination unit 10 through the showcase indoor unit gas pipe 542.

In the defrosting operation of the showcase indoor unit 520, the refrigerant introduced into the showcase indoor unit 520 from the showcase indoor unit gas pipe 542 is condensed in the showcase heat exchanger 522 while emitting heat and flows toward the indoor unit liquid pipe 550.

The indoor unit 50 may include an air conditioning blower fan (not shown) provided in one side of the air conditioning heat exchanger 512 and a showcase blower fan (not shown) provided in one side of the showcase heat exchanger 522. The air conditioning blower fan is operated during the cooling operation and the heating operation of the air conditioning indoor unit 510, and may be stopped when the air conditioning indoor unit 510 is stopped. The showcase blower fan may be operated during the refrigeration operation of the showcase indoor unit 520, and may be stopped during the defrosting operation.

Meanwhile, the first and second indoor expansion valves 513 and 523, and first and second combination expansion valves 313 and 323, and a low pressure expansion valve 160 described later may be an electromagnetic expansion valve (EEV).

Referring to FIG. 1, the combination unit 10 of the air conditioner according to an embodiment of the present disclosure is disposed between the outdoor unit 40 and the indoor unit 50. The combination unit 10 connects the outdoor unit 40 and the indoor unit 50.

The combination unit 10 includes a first gas control unit 100 connected to the air conditioning indoor unit gas pipe 541, a second gas control unit 200 connected to the showcase indoor unit gas pipe 542, a first pipe 30 connecting the outdoor unit liquid pipe 450 and the indoor unit liquid pipe 550, and a second pipe 320 connecting the first pipe 30 and a second gas control unit 200.

The first gas control unit 100 and the second gas control unit 200 are converged to be connected to the outdoor unit gas pipe 440.

One end of the first gas control unit 100 and one end of the second gas control unit 200 may be converged to be connected to the outdoor unit gas pipe 440. The other end of the first gas control unit 100 may be connected to the air conditioning indoor unit 510 through the air conditioning indoor unit gas pipe 541, and the other end of the second gas control unit 200 may be connected to the showcase indoor unit 520 through the showcase indoor unit gas pipe 542.

One ends of the first gas control unit 100 and the second gas control unit 200 mean the outdoor unit 40 side, and the other ends of the first gas control unit 100 and the second gas control unit 200 mean the indoor unit 50 side. The first gas control unit 100 and the second gas control unit 200 may be converged toward the outdoor unit 40 side, and branched to each other toward the indoor unit 50 side.

The first gas control unit may include a first high pressure flow path 130 through which the refrigerant discharged from the compressor 410 during the heating operation of the air conditioning indoor unit 510 flows, and a first low pressure flow path 120 which is connected in parallel with the first high pressure flow path 130 and through which the refrigerant discharged from the air conditioning indoor unit during the cooling operation of the air conditioning indoor unit 510 flows. The first gas control unit 100 may include a first connection flow path 110 connecting the first low pressure flow path 120 and the second pipe 320.

The second gas control unit 200 may include a second low pressure flow path 220 through which the refrigerant discharged from the showcase indoor unit 520 during the refrigeration operation of the showcase indoor unit 520 flows, and a second connection flow path 210 for connecting the second low pressure flow path 220 and the second pipe 320. The second gas control unit may include a second high pressure flow path 230 through which the refrigerant discharged from the compressor during the defrosting operation of the showcase indoor unit 520 flows. The second low pressure flow path may be connected in parallel with the second high pressure flow path.

The combination unit 10 may include a converging flow path 330 connecting one end of the first gas control unit 100 and one end of the second gas control unit 200. The converging flow path 330 may connect the first gas control unit 100 and the second gas control unit 200 with the outdoor unit gas pipe 440.

The converging flow path 330 may be extended from the first low pressure flow path 120 and the second low pressure flow path 220 respectively, and converged with each other to be connected to the outdoor unit gas pipe 440. That is, the converging flow path 330 is connected to the outdoor unit gas pipe 440, and branched into two flow paths to be connected to the first gas control unit 100 and the second gas control unit 200.

The flow path connected to the first gas control unit 100, among the two branched flow paths of the converging flow path 330, is branched into the first low pressure flow path 120 and the first high pressure flow path 130, and the flow path connected with the second gas control unit 200 is branched into the second low pressure flow path 220 and the second high pressure flow path 230. The first low pressure flow path 120 and the first high pressure flow path 130 are converged again to be connected to the air conditioning indoor unit gas pipe 541, and the second low pressure flow path 220 and the second high pressure flow path 230 are converged again to be connected to the showcase indoor unit gas pipe 542. Therefore, the first high pressure flow path 130 and the first low pressure flow path 120 may be connected in parallel to each other, and the second high pressure flow path 230 and the second low pressure flow path 220 may be connected in parallel to each other.

The first low pressure flow path 120 may connect the air conditioning indoor unit 510 and the outdoor unit 40. The first low pressure flow path 120 may be connected to the air conditioning indoor unit gas pipe 541, and may be connected to the outdoor unit gas pipe 440 through the converging flow path 330. One end of the first low pressure flow path 120 may be connected to the air conditioning indoor unit gas pipe 541, and the other end of the first low converging flow path 330.

The first high pressure flow path 130 may be connected in parallel with the first low pressure flow path 120.

The first connection flow path 110 may connect the first gas control unit 100 with the second pipe 320. One end of the first connection flow path 110 may be connected to the first low pressure flow path 120, and the other end of the first connection flow path 110 may be connected to the second pipe 320. The first connection flow path 110 may be branched from the first low pressure flow path 120 and connected to the second pipe 320.

The second low pressure flow path 220 may connect the showcase indoor unit 520 and the outdoor unit 40. The second low pressure flow path 220 may be connected to the showcase indoor unit gas pipe 542, and may be connected to the outdoor unit gas pipe 440 through the converging flow path 330. One end of the second low pressure flow path 220 may be connected to the showcase indoor unit gas pipe 542, and the other end of the second low pressure flow path 220 may be connected to the converging flow path 330.

The second high pressure flow path 230 may be connected in parallel with the second low pressure flow path 220.

The second connection flow path 210 may connect the second gas control unit 200 to the second pipe 320. One end of the second connection flow path 210 may be connected to the second low pressure flow path 220, and the other end of the second connection flow path 210 may be connected to the second pipe 320. The second connection flow path 210 may be branched from the second low pressure flow path 220 and connected to the second pipe 320.

The first high pressure flow path 130 is a flow path through which the refrigerant from the outdoor unit gas pipe 440 toward the air conditioning indoor unit gas pipe 541 flows in the heating operation of the air conditioning indoor unit 510, and the first low pressure flow path 120 is a flow path through which the refrigerant introduced from the air conditioning indoor unit gas pipe 541 flows in the cooling operation of the air conditioning indoor unit 510. The first connection flow path 110 is a flow path guiding the refrigerant introduced into the first low pressure flow path 120 from the air conditioning indoor unit gas pipe 541 to the second pipe 320, in the cooling operation of the air conditioning indoor unit 510 and the defrosting operation of the showcase indoor unit 520.

The second high pressure flow path 230 is a flow path through which the refrigerant from the outdoor unit gas pipe 440 toward the showcase indoor unit gas pipe 542 flows in the defrosting operation of the showcase indoor unit 520, and the second low pressure flow path 220 is a flow path through which the refrigerant introduced from the showcase indoor unit gas pipe 542 flows in the refrigeration operation of the showcase indoor unit 520. The second connection flow path 210 is a flow path guiding the refrigerant introduced into the second low pressure flow path 220 from the showcase indoor unit gas pipe 542 to the second pipe 320 in the refrigeration operation of the showcase indoor unit 520 and the heating operation of the air conditioning indoor unit 510.

The first gas control unit 100 may include a first high pressure solenoid valve 142 provided in the first high pressure flow path 130, a low pressure expansion valve 160 provided in the first low pressure flow path 120, a first low pressure check valve 151 installed in the first flow path 120, and a first connection solenoid valve 141 installed in the first connection flow path 110. The first gas control unit 100 may include a first high pressure check valve 152 which is installed in the first high pressure flow path 130 and blocks a flow from the air conditioning indoor unit gas pipe 541 toward the first high pressure flow path 130.

The first high pressure flow path 130 may be provided with the first high pressure solenoid valve 142 for controlling the flow of the refrigerant flowing through the first high pressure flow path 130. The first high pressure solenoid valve 142 may be installed in the first high pressure flow path 130 and adjust the flow of the refrigerant flowing through the first high pressure flow path 130.

The solenoid valve includes a two-way solenoid valve that blocks two-way flow, when closed, and a one-way solenoid valve that blocks only desired one-way flow and can not block the opposite flow. The one-way solenoid valve is closed to prevent the flow of the refrigerant, and has a risk of damage when there is the opposite flow. The two-way solenoid valve has a complex configuration, and is expensive.

Accordingly, the first high pressure solenoid valve 142 may be a solenoid valve that blocks only one-way flow, and the first high pressure check valve 152 may be installed in one side of the first high pressure solenoid valve 142. A second high pressure solenoid valve 242 described later may also be a solenoid valve that blocks only one-way flow, and a second high pressure check valve 252 may be installed in one side of the second high pressure solenoid valve 242.

The first high pressure solenoid valve 142 may block the flow from the outdoor unit 40 toward the indoor unit 50, when closed. When the first high pressure solenoid valve 142 is opened, the refrigerant introduced into the combination unit 10 from the outdoor unit 40 may flow toward the indoor unit 50 through the first high pressure flow path 130.

The first high pressure check valve 152 may block the flow from the indoor unit 50 to the outdoor unit 40 through the first high pressure flow path 130.

The first high pressure solenoid valve 142 may be installed in the outdoor unit 40 side of the first high pressure flow path 130, and the first high pressure check valve 152 may be installed in the indoor unit 50 side of the first high pressure flow path 130. That is, the first high pressure solenoid valve 142 may be installed closer to the outdoor unit 40 side than the first high pressure check valve 152, and the first high pressure check valve 152 may be installed closer to the indoor unit side 50 than the first high pressure solenoid valve 142.

The low pressure expansion valve 160 may be installed in the first low pressure flow path 120 so as to expand the refrigerant flowing through the first low pressure flow path 120. The low pressure expansion valve 160 may expand the refrigerant flowing through the first low pressure flow path 120 during the cooling operation of the air conditioning indoor unit 510.

The air conditioning indoor unit 510 provides cold air to the room during the cooling operation, and the showcase indoor unit 520 provides cold air to the showcase in which food or the like of low temperature is stored during the refrigeration operation. If cooling is needed, the indoor temperature is generally higher than the temperature in the showcase. Therefore, the evaporation temperature and the evaporation pressure of the air conditioning heat exchanger 512 are higher than the evaporation temperature and the evaporation pressure of the showcase heat exchanger 522.

In the cooling operation of the air conditioning indoor unit 510 and the refrigeration operation of the showcase indoor unit 520, the low pressure expansion valve 160 expands the refrigerant discharged from the air conditioning indoor unit 510 up to the evaporation pressure of the showcase heat exchanger 522, and the refrigerants discharged from the air conditioning indoor unit 510 and the showcase indoor unit 520 are mixed with each other in the converging flow path 330 and flow to the outdoor unit gas pipe 440.

In the cooling operation of the air conditioning indoor unit 510 and the defrosting operation of the showcase indoor unit 520, the low pressure expansion valve 160 expands the refrigerant flowing through the first low pressure flow path 120 up to the evaporation pressure of the outdoor heat exchanger 420.

The first low pressure check valve 151 may be installed in the first low pressure flow path 120 so as to block a flow from the converging flow path 330 toward the first low pressure flow path 120. The first low pressure check valve 151 may block the flow of the refrigerant from the converging flow path 330 toward the first low pressure flow path 120 during the heating operation of the air conditioning indoor unit 510, and guide the first high pressure flow path 130.

The first low pressure check valve 151 is installed in the first low pressure flow path 120 in the converging flow path side, and the low pressure expansion valve 160 is installed in the first low pressure flow path 120 in the indoor unit 50 side. That is, the first low pressure check valve 151 is installed in the first low pressure flow path 120 between the low pressure expansion valve 160 and the converging flow path 330, and the low pressure expansion valve 160 is installed in the first low pressure flow path 120 between the first low pressure check valve 151 and the indoor unit 50.

The first low pressure check valve 151 is installed in the first low pressure flow path 120 between the converging flow path 330 and the first connection flow path 110.

The first connection flow path 110 is branched from the first low pressure flow path 120 between the first low pressure check valve 151 and the low pressure expansion valve 160.

The first connection solenoid valve 141 may be installed in the first connection flow path 110. When the first connection solenoid valve 141 is closed, the flow of the refrigerant flowing from the first low pressure flow path 120 toward the second pipe 320 through the first connection flow path 110 may be blocked. Therefore, when the high pressure refrigerant discharged from the compressor 410 flows into the first gas control unit 100, the refrigerant flows through the first high pressure flow path 130, and then a flow flowing to the second pipe 320 through the first connection flow path 110 may be blocked.

In addition, when the first connection solenoid valve 141 is closed, a high-pressure refrigerant introduced into the first connection flow path 110 through the first high pressure flow path 130 may exist in one side of the first connection solenoid valve 141, and a low pressure refrigerant introduced into the first connection flow path 110 from the second pipe 320 may exist in the other side of the first connection solenoid valve 141. In the refrigerants positioned respectively in both sides of the first connection solenoid valve 141, not only a flow from the first low pressure flow path 120 toward the second pipe 320 may be blocked due to the close of the first connection solenoid valve 141, but also a flow from the second pipe 320 toward the first low pressure flow path 120 through the first connection flow path 110 may be blocked due to a pressure difference between both ends of the first connection solenoid valve 141.

Meanwhile, the first connection flow path 110 may further include a first connection check valve (not shown) for blocking the flow from the second pipe 320 toward the first connection flow path 110, between the second pipe 320 and the first connection solenoid valve 141.

Alternatively, the first connection solenoid valve 141 may be a solenoid valve that blocks the two-way flow when closed.

The second gas control unit 200 may include a second high pressure solenoid valve 242 which is installed in the second high pressure flow path 230 and controls the flow of the refrigerant flowing through the second high pressure flow path 230, a second low pressure check valve 251 which is installed in the second low pressure flow path 220 and blocks the refrigerant flow from the converging flow path 330 toward the second low pressure flow path 220, and a second connection solenoid valve 241 which is installed in the second connection flow path 210 and controls the flow of the refrigerant flowing through the second connection flow path 210. The second gas control unit 200 includes a second high pressure check valve 252 which is installed in the second high pressure flow path 230 and blocks a flow from the showcase indoor unit gas pipe 542 toward the second high pressure flow path 230.

The second high pressure flow path 230 may be provided with a second high pressure solenoid valve 242 for controlling the flow of the refrigerant flowing through the second high pressure flow path 230. The second high pressure solenoid valve 242 may be installed in the second high pressure flow path 230 and adjust the flow of the refrigerant flowing through the second high pressure flow path 230.

The second high pressure solenoid valve 242 may block the flow from the outdoor unit 40 toward the indoor unit 50, when closed. When the second high pressure solenoid valve 242 is opened, the refrigerant introduced into the combination unit 10 from the outdoor unit 40 may flow toward the indoor unit 50 through the second high pressure flow path 230.

The second high pressure check valve 252 may block the flow from the indoor unit 50 toward the outdoor unit 40 through the second high pressure flow path 230.

The second high pressure solenoid valve 242 may be installed in the outdoor unit 40 side of the second high pressure flow path 230, and the second high pressure check valve 252 may be installed in the indoor unit 50 side of the second high pressure flow path 230. That is, the second high pressure solenoid valve 242 may be installed closer to the outdoor unit 40 side than the second high pressure check valve 252, and the second high pressure check valve 252 may be installed closer to the indoor unit 50 side than the second high pressure solenoid valve 242.

The second low pressure flow path 220 may be provided with a second low pressure check valve 251 for blocking the flow from the converging flow path 330 toward the second low pressure flow path 220. The second low pressure check valve 251 may block the flow of the refrigerant from the converging flow path 330 toward the second low pressure flow path 220 during the defrosting operation of the showcase indoor unit 520, and guide to face the second high pressure flow path 230.

The second low pressure check valve 251 is installed in the second low pressure flow path 220 between the converging flow path 330 and the second connection flow path 210.

The second connection flow path 210 is branched from the second low pressure flow path 220 between the second low pressure check valve 251 and the end of the indoor unit 50 side of the second low pressure flow path 220.

A second connection solenoid valve 241 may be installed in the second connection flow path 210. When the second connection solenoid valve 241 is closed, the flow of the refrigerant from the second low pressure flow path 220 toward the second pipe 320 through the second connection flow path 210 may be blocked. Therefore, when the high pressure refrigerant discharged from the compressor 410 flows into the second gas control unit 200, the refrigerant may flow through the second high pressure flow path 230, and a flow to the second pipe 320 through the second connection flow path 210 may be blocked.

Similarly to the first connection solenoid valve 141, when the second connection solenoid valve 241 is closed, not only a flow from the second low pressure flow path 220 toward the second pipe 320 may be blocked, but also a flow from the second pipe 320 toward the second low pressure flow path 220 through the second connection flow path 210 may be blocked.

Meanwhile, the second connection flow path 210 may further include a second connection check valve (not shown) for blocking the flow from the second pipe 320 toward the second connection flow path 210, between the second pipe 320 and the second connection solenoid valve 241.

Alternatively, the second connection solenoid valve 241 may be a solenoid valve that blocks the two-way flow, when closed.

The first pipe 30 connects the outdoor unit liquid pipe 450 and the indoor unit liquid pipe 550. The first pipe 30 may include two flow paths connected in parallel with each other. One of the two flow paths connected in parallel with each other is a flow path for the refrigerant flowing from the outdoor unit liquid pipe 450 toward the indoor unit liquid pipe 550 during the cooling operation of the air conditioning indoor unit 510 and the defrost operation of the showcase indoor unit 520. The other flow path is a flow path for the refrigerant flowing from the indoor unit liquid pipe 550 toward the outdoor unit liquid pipe 450 during the heating operation of the air conditioning indoor unit 510 and/or the defrosting operation of the showcase indoor unit 520.

The combination unit 10 may include a first pipe check valve 315 installed in the first pipe 30, and a first combination expansion valve 313 which is installed in the first pipe 30 and connected in parallel with the first pipe check valve 315.

The first pipe check valve 315 may be installed in a flow path in which the refrigerant flows from the outdoor unit liquid pipe 450 toward the indoor unit liquid pipe 550 among two flow paths connected in parallel with each other in the first pipe 30. The first pipe check valve 315 may block the flow of the refrigerant introduced from the indoor unit liquid pipe 550.

The first combination expansion valve 313 may be installed in a flow path in which a refrigerant flows from the indoor unit liquid pipe 550 toward the outdoor unit liquid pipe 450 among two flow paths connected in parallel with each other in the first pipe 30. The first combination expansion valve 313 may expand the refrigerant introduced from the indoor unit liquid pipe 550 or block the flow of the refrigerant introduced from the outdoor unit liquid pipe 450.

The first combination expansion valve 313 may be closed during the cooling operation of the air conditioning indoor unit 510 and the refrigeration operation of the showcase indoor unit 520. The first combination expansion valve 313 may expand the refrigerant flowing through the first pipe 30 by adjusting the opening degree during the defrosting operation of the air conditioning indoor unit 510 and/or the defrosting operation of the showcase indoor unit 520.

The second pipe 320 connects the first pipe 30 and the second gas control unit 200. The second pipe 320 is branched from the first pipe 30 and connected to the second gas control unit 200. The second pipe 320 may connect the first pipe 30 to the first gas control unit 100 and the second gas control unit 200.

The second pipe 320 may be branched from the first pipe 310 between two parallel flow paths of the first pipe 310 and an end portion of the outdoor unit 40 side of the first pipe 310. That is, the second pipe 320 may be branched from the first pipe 310 in the outdoor unit 40 side than the flow path where the first pipe check valve 315 is installed and the flow path where the first combination expansion valve 313 is installed.

The combination unit 10 may include a second combination expansion valve 323 installed in the second pipe 320 and a second pipe check valve 325 installed in the second pipe 320. The second pipe check valve 325 may be installed in the second pipe 320 between a point where the second pipe 320 is branched from the first pipe 30 and the second connection flow path 210. The second combination expansion valve 323 may be installed in the second pipe 320 between the second pipe check valve 325 and the second connection flow path 210.

As shown in FIG. 1, the first connection flow path 110 may be connected to the second pipe 320 between a point where the second connection flow path 210 is connected to the second pipe 320 and the second pipe check valve 325, and the second combination expansion valve 323 may be installed between the second pipe check valve 325 and the first connection flow path 110. Alternatively, unlike FIG. 1, the second pipe 320 may be installed between the first connection flow path 110 and the second connection flow path 210.

The second pipe check valve 325 may block the flow of the refrigerant from the outdoor unit liquid pipe 450 toward the second pipe 320. That is, the second pipe check valve 325 may block the flow of the refrigerant from the first pipe 30 toward the second pipe 320.

The second combination expansion valve 323 may expand the refrigerant introduced into the second pipe 320 from the second gas control unit 200. When installed in the second pipe 320 between the second pipe check valve 325 and the first connection flow path 110, the second combination expansion valve 323 may adjust the opening degree to expand the refrigerant introduced into the second pipe 320 from the second gas control unit 200, in the heating operation of the air conditioning indoor unit 510 and the refrigeration operation of the showcase indoor unit 520. In addition in the cooling operation of the air conditioning indoor unit 510 and the defrosting operation of the showcase indoor unit 520, the second combination expansion valve 323 may be fully opened so that the refrigerant introduced into the second pipe 320 from the first gas control unit 100 may be passed without a pressure drop.

Meanwhile, the second combination expansion valve 323 may be installed in the outdoor unit liquid pipe 450, not in the second pipe 320. The second combination expansion valve 323 is named by reflecting the installation position, and may also be referred to as 'an outdoor expansion valve' when installed in the outdoor unit liquid pipe 450.

When the second combination expansion valve 323 is not installed in the second pipe 320 but the outdoor expansion valve is installed in the outdoor unit liquid pipe 450, the first combination expansion valve 313 may expand the refrigerant introduced into the first pipe 30 in the same pressure as that of the refrigerant passing through the second pipe check valve 325. The refrigerant expanded through the first combination expansion valve 313 and the refrigerant passed through the second pipe check valve 325 may be mixed to flow into the outdoor unit liquid pipe 450, pass through the outdoor expansion valve, and be expanded up to the evaporation pressure of the outdoor heat exchanger 420.

The flow of the refrigerant of the air conditioner and the valve control of the controller 60 according to the present disclosure configured as described above will be explained as follows.

Figure 2:
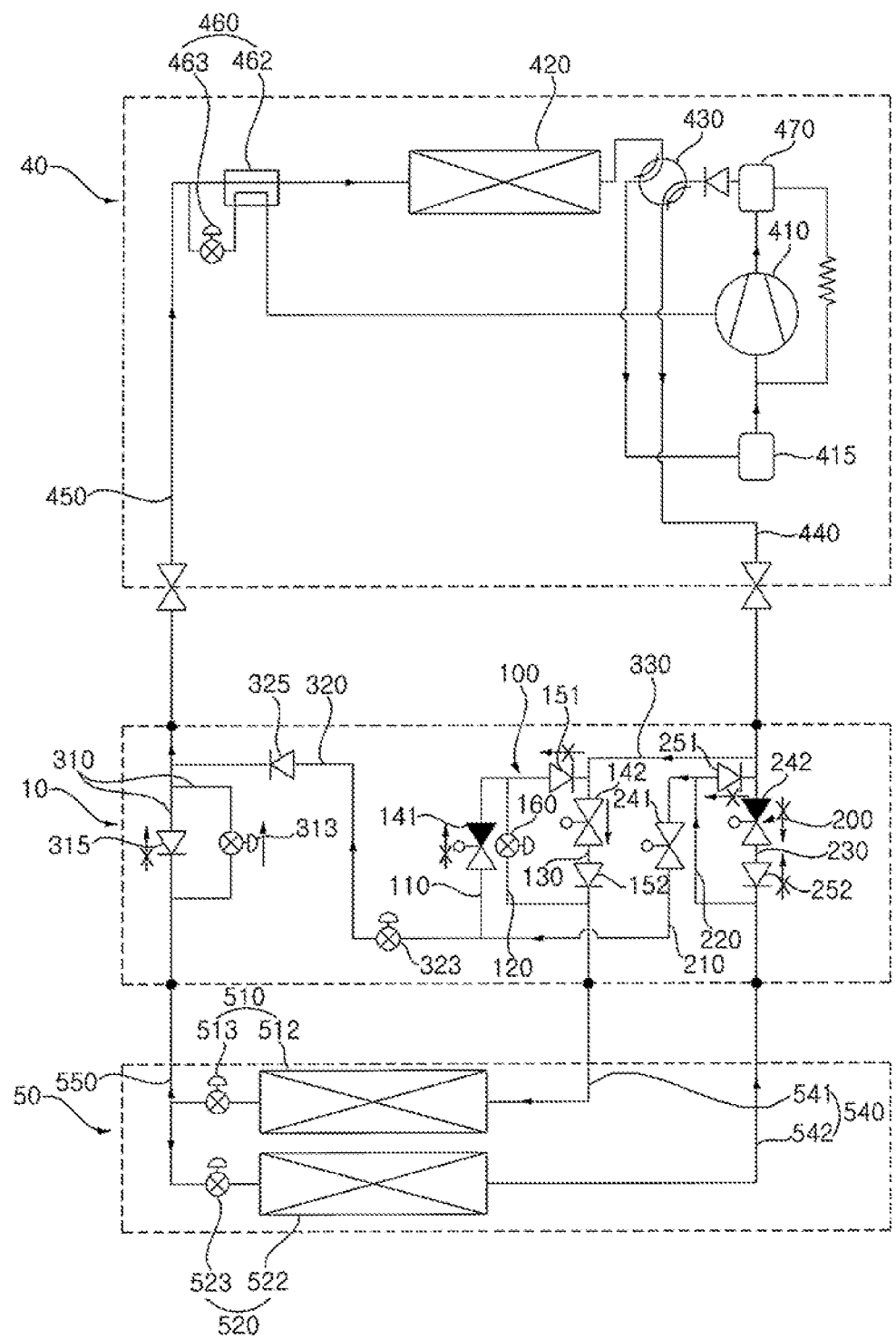
FIG. 2 is a configuration diagram showing the refrigerant flow during the heating operation of an air conditioning indoor unit and the refrigeration operation of a showcase indoor unit.
Figure 3:
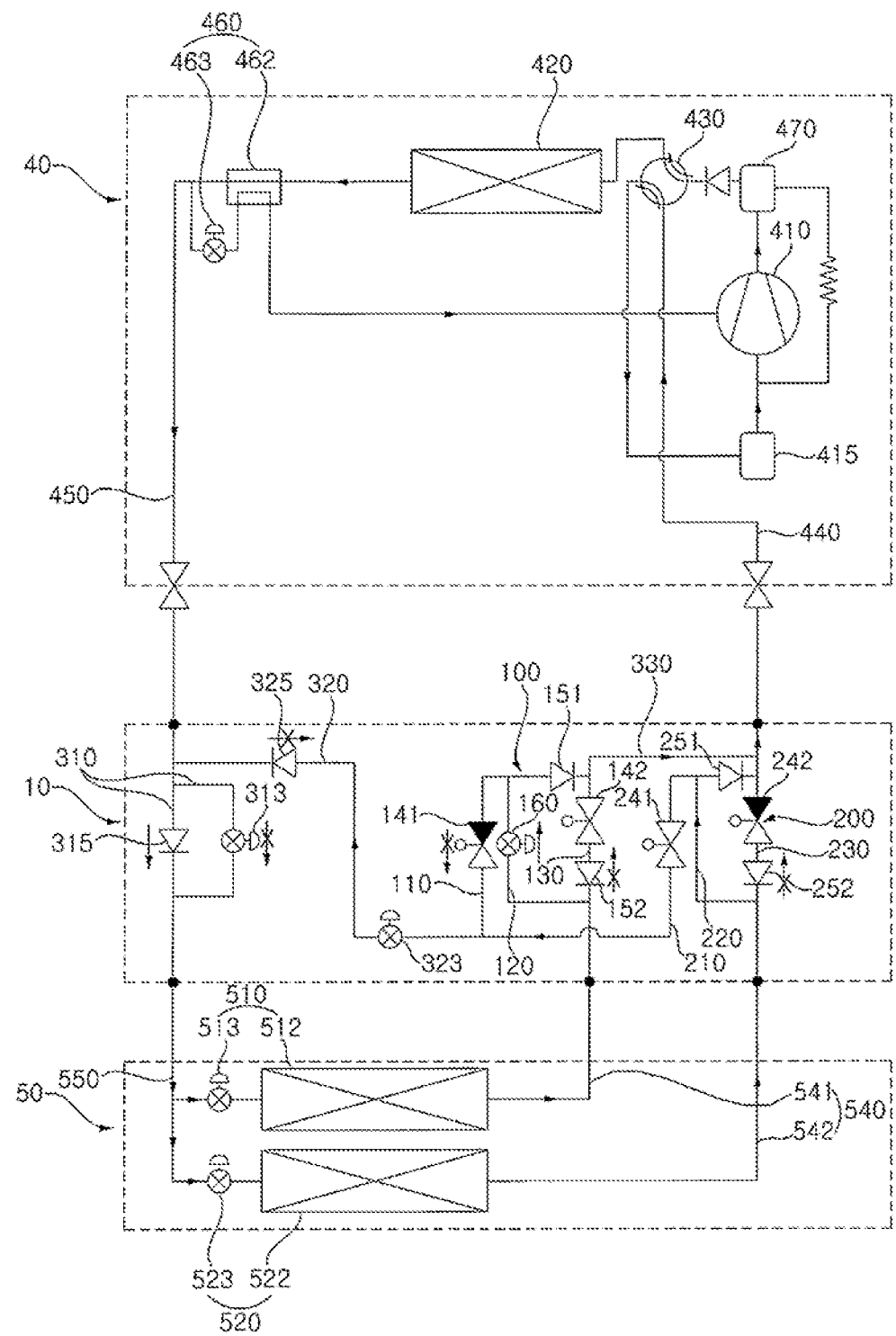
FIG. 3 is a configuration diagram showing the refrigerant flow during the cooling operation of an air conditioning indoor unit and the refrigeration operation of a showcase indoor unit.
Figure 4:
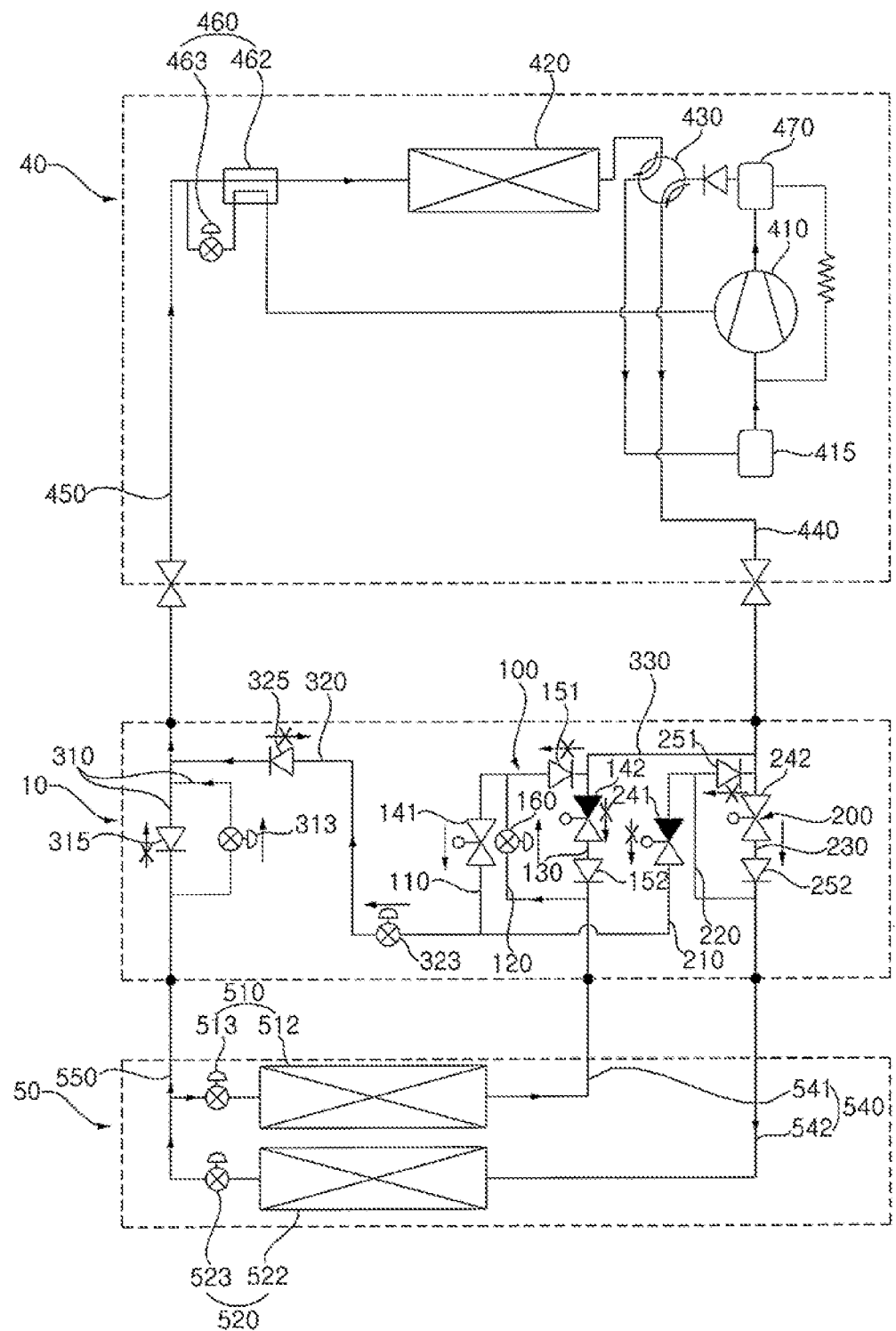
FIG. 4 is a configuration diagram showing the refrigerant flow during the cooling operation of an air conditioning indoor unit and the defrost operation of a showcase indoor unit.
Figure 5:
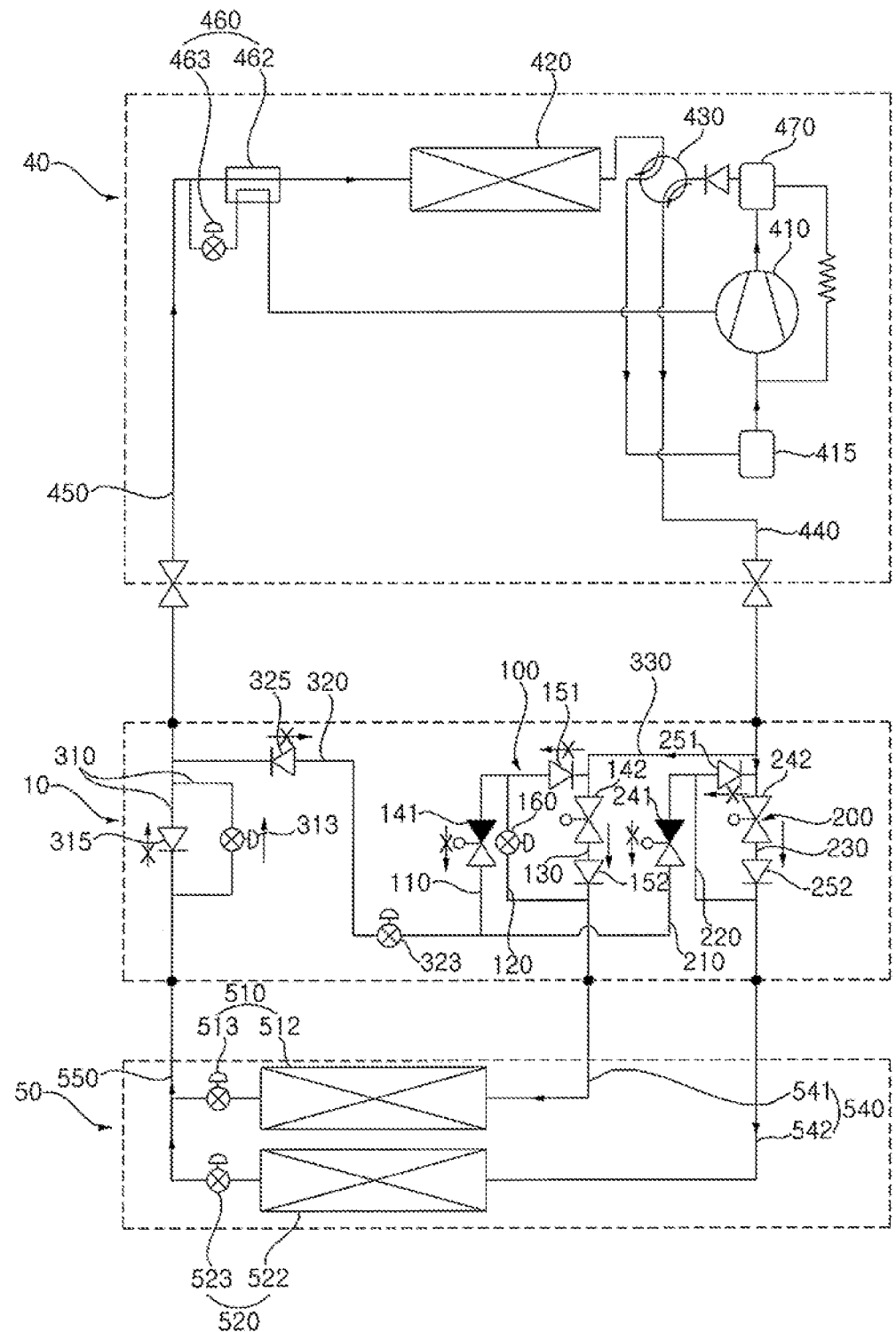
FIG. 5 is a configuration diagram showing the refrigerant flow during the heating operation of an air conditioning indoor unit and the defrost operation of a showcase indoor unit.
Figure 6:
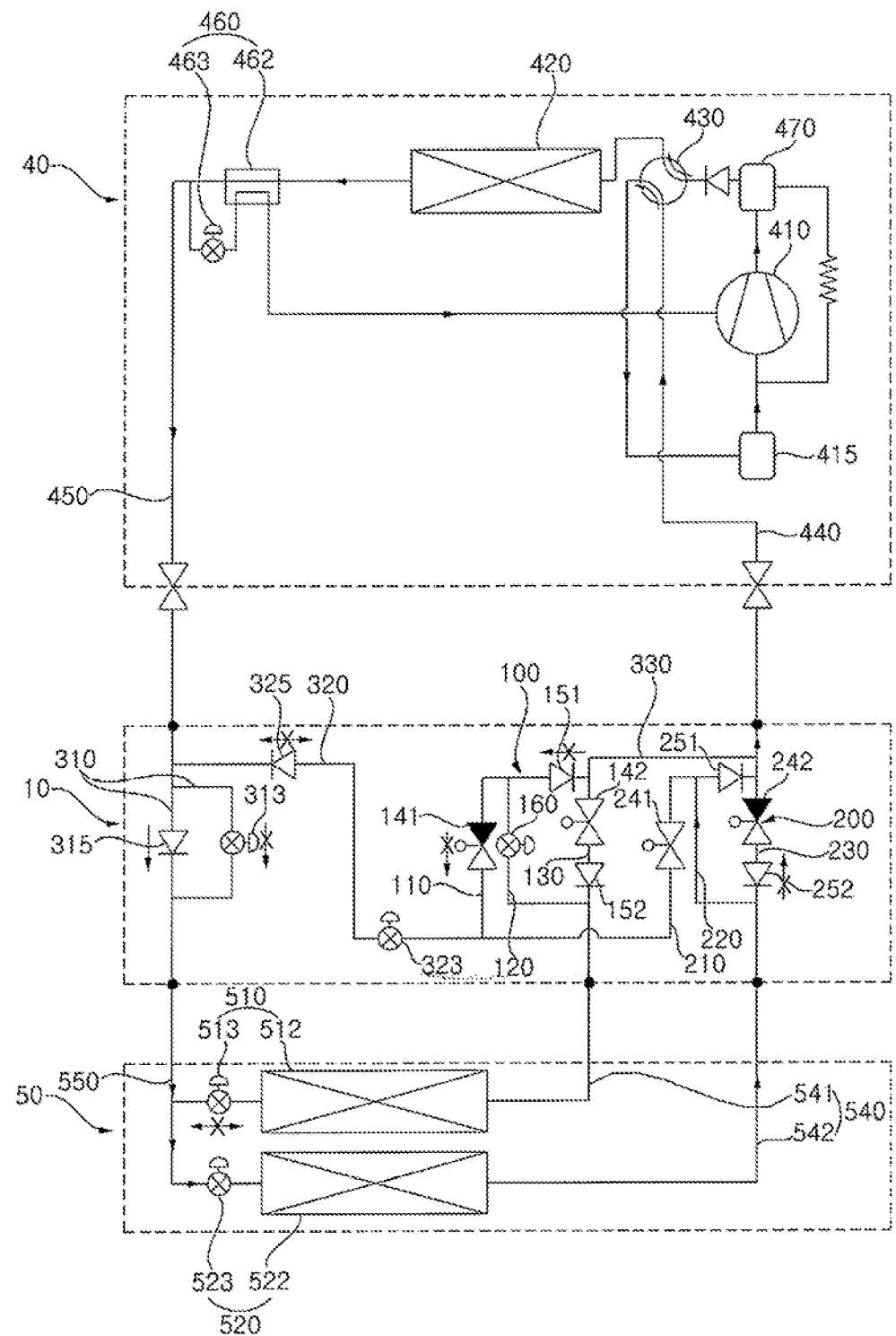
FIG. 6 is a configuration diagram showing the refrigerant flow during the operation stop of an air conditioning indoor unit and the refrigeration operation of a showcase indoor unit.

FIGS. 2 to 6 are configuration diagrams showing the refrigerant flow according to the operation of the indoor unit 50, FIG. 2 is a configuration diagram showing the refrigerant flow during the heating operation of an air conditioning indoor unit 510 and the refrigeration operation of a showcase indoor unit 520, FIG. 3 is a configuration diagram showing the refrigerant flow during the cooling operation of an air conditioning indoor unit 510 and the refrigeration operation of a showcase indoor unit 520, FIG. 4 is a configuration diagram showing the refrigerant flow during the cooling operation of an air conditioning indoor unit 510 and the defrost operation of a showcase indoor unit 520. FIG. 5 is a configuration diagram showing the refrigerant flow during the heating operation of an air conditioning indoor unit 510 and the defrost operation of a showcase indoor unit 520, FIG. 6 is a configuration diagram showing the refrigerant flow during the operation stop of an air conditioning indoor unit 510 and the refrigeration operation of a showcase indoor unit 520, and FIG. 7 is a block diagram showing a configuration related with a controller 60 of an air conditioner according to an embodiment of the present disclosure.

Figure 7:
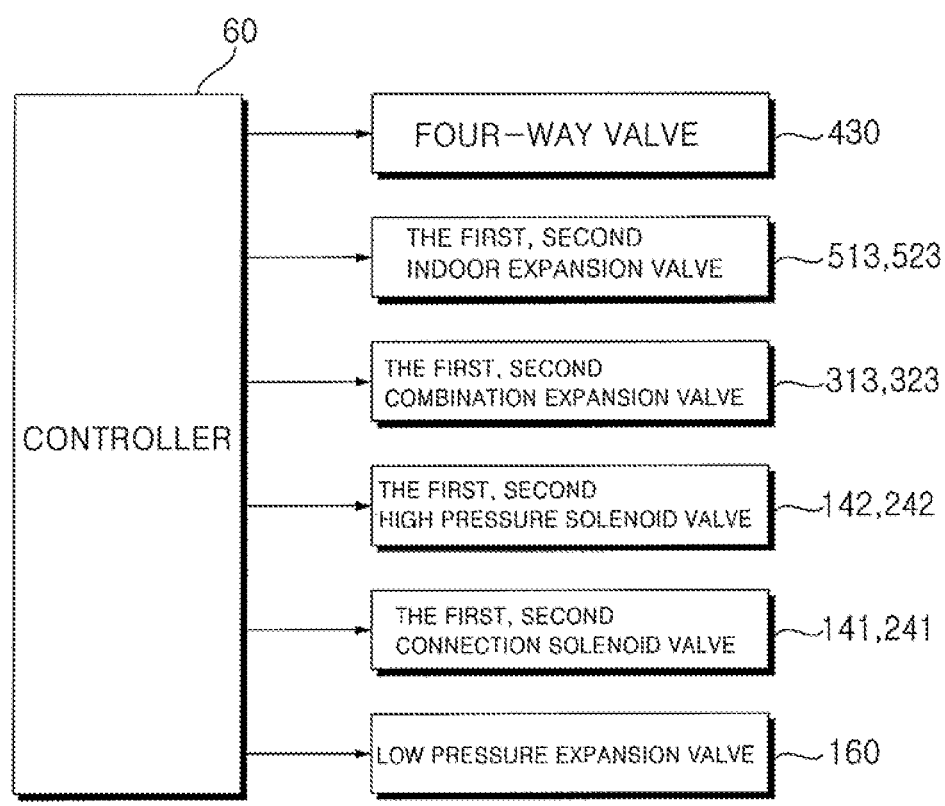
FIG. 7 is a block diagram showing a configuration related with a controller of an air conditioner according to an embodiment of the present disclosure.

Referring to FIGS. 2 and 7, the valve control of the controller 60 and the flow of the refrigerant in the heating operation of the air conditioning indoor unit 510 and the refrigeration operation of the showcase indoor unit 520 will be described.

The controller 60 controls the four-way valve 430 to connect the outlet flow path (or oil separator 470) of the compressor 410 and the outdoor unit gas pipe 440, and to connect the inlet flow path of the compressor 410 (or the accumulator 415) and the outdoor heat exchanger 420.

The controller 60 opens the first high pressure solenoid valve 142 and closes the first connection solenoid valve 141. The controller 60 closes the second high pressure solenoid valve 242 and opens the second connection solenoid valve.

The controller 60 adjusts the opening degree of the first combination expansion valve 313 and expands the refrigerant flowing through the first pipe 30 up to the evaporation pressure of the outdoor heat exchanger 420. The controller 60 completely opens the first indoor expansion valve 513 to allow the refrigerant discharged from the air conditioning heat exchanger 512 to flow toward the indoor unit liquid pipe 550 without a pressure drop, and adjusts the opening degree of the second indoor expansion valve 523 to expand the refrigerant introduced into the showcase indoor unit 520 from the air conditioning indoor unit 510 by the evaporation pressure of the showcase heat exchanger 522.

The refrigerant is compressed into a vapor state of high temperature and high pressure by the compressor 410 and discharged together with oil. The high temperature and high pressure vapor refrigerant and oil discharged from the compressor 410 are introduced into the oil separator 470, and separated from each other, so that the refrigerant is introduced into the four-way valve 430, and the oil is recovered into the inlet flow path of the compressor 410.

The refrigerant discharged from the compressor 410 is guided to the outdoor unit gas pipe 440 by the four-way valve 430 and flows toward the combination unit 10. The refrigerant introduced into the combination unit 10 flows into the first gas control unit along the converging flow path 330.

In the refrigerant flowing toward the second gas control unit 200 from the converging flow path, a flow toward the second low pressure flow path 220 is blocked, by the second low pressure check valve 251, and the second high pressure solenoid valve 242 is closed to block the flow toward the second high pressure flow path 230. Therefore, the flow of the refrigerant from the converging flow path 330 toward the second gas control unit 200 is blocked.

In the refrigerant flowing into the first gas control unit 100, the flow toward the first low pressure flow path 120 is blocked by the first low pressure check valve 151 and the refrigerant flows toward the air conditioning indoor unit gas pipe 541 along the first high pressure flow path 130.

The refrigerant introduced into the air conditioning indoor unit 510 through the air conditioning indoor unit gas pipe 541 exchanges heat with the indoor air in the air conditioning heat exchanger 512. The refrigerant introduced into the air conditioning heat exchanger 512 is condensed by emitting heat into the room, and the air conditioning indoor unit 510 heats the room. The air conditioning heat exchanger 512 serves as a condenser.

The high temperature and high pressure condensation refrigerant discharged from the air conditioning heat exchanger 512 flows to the indoor unit liquid pipe 550 without a pressure drop as the first indoor expansion valve 513 is completely opened. A part of the refrigerant introduced into the indoor unit liquid pipe 550 flows into the showcase indoor unit 520, and the remaining part of the refrigerant flows into the first pipe 30.

In the refrigerant introduced into the first pipe 30, the flow toward the flow path where the first pipe check valve 315 is installed is blocked by the first pipe check valve 315, and the refrigerant flows into the flow path where the first combination expansion valve 313 is installed. The refrigerant passes through the first combination expansion valve 313 and is expanded up to the evaporation pressure of the outdoor heat exchanger 420.

The refrigerant introduced into the showcase indoor unit 520 passes through the second indoor expansion valve 523 and is expanded by the evaporation pressure of the showcase heat exchanger 522. In season when heating is required, the outdoor temperature may be lower than the temperature of the showcase where food is stored. Therefore, the evaporation pressure of the showcase heat exchanger 522 may be higher than the evaporation pressure of the outdoor heat exchanger 420.

The refrigerant expanded through the second indoor expansion valve 523 flows into the showcase heat exchanger, and exchanges heat with the air in the showcase in the showcase heat exchanger 522. The refrigerant introduced into the showcase heat exchanger 522 is evaporated by absorbing heat in the showcase, and the showcase indoor unit 520 provides cold air to the showcase. The showcase heat exchanger 522 serves as an evaporator.

The low-temperature, low-pressure vapor refrigerant discharged from the showcase indoor unit 520 or the refrigerant having a high dry two-phase state is introduced into the second gas control unit 200 through the showcase indoor unit gas pipe 542.

In the refrigerant introduced into the second gas control unit 200, a flow toward the second high pressure flow path 230 is blocked by the second high pressure check valve 252, and the refrigerant flows along the second low pressure flow path 220. Since there is a high pressure refrigerant in the second high pressure flow path 230 side of the second low pressure check valve 251, and there is a low pressure refrigerant in the second connection flow path 210 side, the flow of the refrigerant, which flows through the second low pressure flow path 220, toward the second high pressure flow path 230 is blocked, and guided to the second connection flow path 210.

The refrigerant introduced into the second connection flow path 210 flows into the second pipe 320, passes through the low pressure expansion valve 160, is expanded by the evaporation pressure of the outdoor heat exchanger 420, and is mixed with the refrigerant that is introduced into the first pipe 30 and expanded while passing through the first combination expansion valve 313 to flow into the outdoor unit liquid pipe 450. The refrigerant introduced into the outdoor unit liquid pipe 450 is introduced into the outdoor heat exchanger 420, and exchanges heat with the indoor air and is evaporated. The outdoor heat exchanger 420 serves as an evaporator.

The low-temperature low-pressure vapor state or the high dry two-phase state refrigerant discharged from the outdoor heat exchanger 420 is guided to the accumulator 415 by the four-way valve 430. The accumulator 415 separates the two-phase refrigerant into a vapor refrigerant and a liquid refrigerant, and guides the vapor refrigerant to the compressor 410.

In the heating operation of the air conditioning indoor unit 510 and the refrigeration operation of the showcase indoor unit 520, the heat of condensation generated in a refrigeration cycle for cooling the showcase is used in the air conditioning indoor unit 510. Therefore, the indoor space can be heated without additional energy input.

Referring to FIGS. 3 and 7, the valve control of the controller 60 and the flow of the refrigerant during the cooling operation of the air conditioning indoor unit 510 and the refrigeration operation of the showcase indoor unit 520 will be described.

The controller 60 controls the four-way valve 430 and connects the outlet flow path (or oil separator 470) of the compressor 410 and the outdoor heat exchanger 420, and connects the inlet flow path (or the accumulator 415) of the compressor 410 and the gas pipe 440 of the outdoor unit.

The controller 60 closes the first connection solenoid valve 141 and the second high pressure solenoid valve 242. The controller 60 may open the first high pressure solenoid valve 142 and the second connection solenoid valve 241.

When a closed circuit in which both two-way flows of the refrigerant flow path are blocked is formed, the volume of the refrigerant remaining in the closed circuit may be changed according to the temperature and the state change, which may damage the refrigerant flow path. For example, when both the first connection solenoid valve 141 and the second connection solenoid valve 241 are closed, the second pipe 320 may have a closed circuit. The controller 60 may open the second connection solenoid valve 241 to prevent the closed circuit from being formed in the second pipe 320, and open the first high pressure solenoid valve 142 to prevent the closed circuit from being formed in the first high pressure flow path 130.

The controller 60 closes the first combination expansion valve 313, and adjusts the opening degree of the low pressure expansion valve 160 to expand the refrigerant flowing through the first low pressure flow path 120 up to the evaporation pressure of the showcase heat exchanger 522. The controller 60 adjusts the opening degree of the first indoor expansion valve 513 to expand the refrigerant introduced into the air conditioning indoor unit 510 by the evaporation pressure of the air conditioning heat exchanger 512, and adjusts the opening degree of the second indoor expansion valve 523 to expand the refrigerant introduced into the showcase indoor unit 520 by the evaporation pressure of the showcase heat exchanger 522. In the season when cooling is required, the indoor temperature may be higher than the temperature in the showcase, so the air conditioning heat exchanger evaporation pressure may be higher than the showcase heat exchanger evaporation pressure.

Hereinafter, detailed descriptions of flows that are the same as or similar to those of the aforementioned refrigerant flow will be omitted in the description of the flow of the refrigerant.

The refrigerant compressed in a vapor state of high temperature and high pressure by the compressor 410 is introduced into the four-way valve 430, guided to the outdoor heat exchanger 420 by the four-way valve 430, and heat-exchanges with the outdoor air in the outdoor heat exchanger 420. The refrigerant is condensed in the outdoor heat exchanger 420 while emitting heat. The refrigerant discharged from the outdoor heat exchanger 420 may be a liquid state of high temperature and high pressure or a two phase state having low dry.

The refrigerant discharged from the outdoor heat exchanger 420 flows into the supercooler 460. When supercooling is required, the controller 60 may expand a part of the refrigerant discharged from the supercooling heat exchanger 462 by adjusting the opening degree of the supercooling expansion valve 463.

A part of the refrigerant discharged from the supercooling heat exchanger 462 may flow into a flow path in which the supercooling expansion valve 463 is installed, and may expand in the supercooling expansion valve 463 and flow into the supercooling heat exchanger 462. The refrigerant introduced into the supercooling heat exchanger 462 from the outdoor heat exchanger 420 may exchange heat with the refrigerant expanded while passing through the supercooling expansion valve 463 and be supercooled.

The refrigerant introduced into the supercooling heat exchanger 462 through the supercooling expansion valve 463 may heat-exchange with the refrigerant discharged from the outdoor heat exchanger 420 and introduced into the supercooling heat exchanger 462 and may be injected into the intermediate pressure stage of the compressor 410.

The remaining part of the refrigerant supercooled and discharged from the supercooling heat exchanger 462 flows into the first pipe 30 of the combination unit 10 through the outdoor unit liquid pipe 450. The flow of the refrigerant, which is introduced into the first pipe 30, toward the second pipe 320 is blocked by the second pipe check valve 325, and is guided to the indoor unit liquid pipe 550 along a flow path in which the first pipe check valve 315 is installed.

A part of the refrigerant introduced into the outdoor unit liquid pipe 450 is introduced into the air conditioning indoor unit 510, and the remaining part is introduced into the showcase indoor unit 520.

The refrigerant introduced into the air conditioning indoor unit 510 passes through the first indoor expansion valve 513 and is expanded by the evaporation pressure of the air conditioning heat exchanger 512, and exchanges heat with the indoor air while passing through the air conditioning heat exchanger 512. The refrigerant introduced into the air conditioning heat exchanger 512 absorbs heat from the indoor air and is evaporated, and the air conditioning heat exchanger 512 may provide cold air to the indoor space. The air conditioning heat exchanger 512 serves as an evaporator.

The refrigerant discharged from the air conditioning heat exchanger 512 flows into the first gas control unit 100 through the air conditioning indoor unit gas pipe 541. The refrigerant introduced into the first gas control unit 100 flows along the first low pressure flow path 120, and the flow toward the first high pressure flow path 130 is blocked by the first high pressure check valve 152.

The refrigerant flowing along the first low pressure flow path 120 may pass through the low pressure expansion valve 160, be expanded up to the evaporation pressure of the showcase heat exchanger 522, and flow into the converging flow path 330. The flow of the refrigerant, which flows along the first low pressure flow path, toward the first low pressure flow path 120 is blocked by the first connection solenoid valve 141.

The refrigerant introduced into the showcase indoor unit 520 passes through the second indoor expansion valve 523, is expanded by the evaporation pressure of the showcase heat exchanger 522, passes through the showcase heat exchanger 522, and exchanges heat with the air in the showcase. The evaporation pressure of the showcase heat exchanger 522 may be lower than the evaporation pressure of the air conditioning heat exchanger 512. The refrigerant introduced into the showcase heat exchanger 522 may absorb heat from the air in the showcase and be evaporated, and provide cold air into the showcase. The showcase heat exchanger 522 serves as an evaporator.

The refrigerant discharged from the showcase heat exchanger 522 flows into the second gas control unit 200 through the showcase indoor unit gas pipe 542. The refrigerant introduced into the second gas control unit 200 flows along the second low pressure flow path 220, and the flow toward the second high pressure flow path 230 is blocked by the second high pressure check valve 252.

The refrigerant flowing along the second low pressure flow path 220 and the refrigerant flowing along the first low pressure flow path 120 are mixed in the converging flow path 330 and introduced into the outdoor unit gas pipe 440.

The refrigerant introduced into the outdoor unit gas pipe 440 is guided to the accumulator 415 by the four-way valve 430, separated into a vapor refrigerant and a liquid refrigerant in the accumulator 415 and the separated vapor refrigerant is supplied to the compressor 410.

Referring to FIGS. 2 and 3, the air conditioning indoor unit 510 may switch between cooling and heating operations, and the showcase indoor unit 520 can perform refrigeration operation. When the showcase indoor unit 520 operates in the refrigeration operation and the air conditioning indoor unit 510 operates in the cooling or heating operation, the first connection flow path 110 of the first gas control unit 100 and the second high pressure flow path 230 of the second gas control unit 200 are blocked.

Accordingly, the first gas control unit 100 may include the first low pressure flow path 120, the first high pressure flow path 130, and valves 142, 151, 152, and 160 installed in the flow paths 120 and 130. The second gas control unit 200 may include the second connection flow path 210, the second low pressure flow path 220, and valves 241 and 251 installed in the flow paths 210 and 220. That is, even when the first gas control unit 100 does not include the first connection flow path 110 and the first connection solenoid valve 141, and when the second gas control unit 200 does not include the second high pressure flow path 230, the second high pressure solenoid valve 242, and the second high pressure check valve 252, the air conditioning indoor unit 510 can perform cooling and heating operations, and the showcase indoor unit 520 can perform refrigeration operation.

In this case, the first high pressure flow path 130 may be referred to as a high pressure flow path, and the second connection flow path 210 may be referred to as a connection flow path. In addition, the first high pressure solenoid valve 142, the first high pressure check valve 152, and the second connection solenoid valve 241 may be referred to as a high pressure solenoid valve, a high pressure check valve, and a connection solenoid valve, respectively.

Referring to FIGS. 4 and 7, the valve control of the controller 60 and the flow of the refrigerant during the cooling operation of the air conditioning indoor unit 510 and the defrosting operation of the showcase indoor unit 520 will be described.

The controller 60 controls the four-way valve 430 and connects the outlet flow path (or oil separator 470) of the compressor 410 to the outdoor unit gas pipe 440, and connects the inlet flow path (or the accumulator 415) of the compressor 410 to the outdoor heat exchanger 420.

The controller 60 closes the first high pressure solenoid valve 142 and opens the first connection solenoid valve 141. The controller 60 opens the second high pressure solenoid valve 242 and closes the second connection solenoid valve 241.

The controller 60 adjusts the opening degree of the first combination expansion valve 313 and the low pressure expansion valve 160 to expand the refrigerant flowing through the first pipe 30 and the refrigerant flowing through the first low pressure flow path 120 up to the evaporation pressure of the outdoor heat exchanger 420. The controller 60 completely opens the second indoor expansion valve 523 to allow the refrigerant discharged from the showcase heat exchanger 522 to flow to the indoor unit liquid pipe 550 without a pressure drop, and adjusts the opening degree of the first indoor expansion valve 513 to expand the refrigerant introduced into the air conditioning indoor unit 510 from the showcase indoor unit 520 by the evaporation pressure of the air conditioning heat exchanger 512.

The refrigerant compressed in a vapor state of high temperature and high pressure by the compressor 410 is guided to the outdoor unit gas pipe 440 by the four-way valve 430, and flows into the converging flow path 330 of the combination unit 10. The flow of the refrigerant from the converging flow path 330 to the first gas control unit 100 is blocked by the first low pressure check valve 151 and the first high pressure solenoid valve 142, and the refrigerant introduced into the converging flow path 330 flows into the second gas control unit 200.

The flow of the refrigerant, which is introduced into the second gas control unit 200, toward the second low pressure flow path 220 is blocked by the second low pressure check valve 251, and the refrigerant flows to the showcase indoor unit gas pipe 542 through the second high pressure flow path 230.

A part of the refrigerant flowing through the second high pressure flow path 230 may flow into the second low pressure flow path 220, but the second connection solenoid valve 241 is closed, so that the flow toward the second pipe 320 through the second connection flow path 210 is blocked.

The refrigerant introduced into the showcase indoor unit gas pipe 542 is condensed through the showcase heat exchanger 522, and emits heat. The condensation heat discharged from the refrigerant may remove frost formed in the showcase heat exchanger 522. In this case, the blower fan mounted in the showcase heat exchanger 522 may be stopped. The showcase heat exchanger 522 serves as a condenser.

The refrigerant discharged from the showcase heat exchanger 522 passes through the second indoor expansion valve 523 without a pressure drop and flows into the indoor unit liquid pipe 550. A part of the refrigerant introduced into the indoor unit liquid pipe 550 flows into the first pipe 30 of the combination unit 10, and the remaining portion flows into the air conditioning indoor unit 510.

The refrigerant introduced into the first pipe 30 from the outdoor unit liquid pipe 450 passes through the first combination expansion valve 313 and is expanded up to the evaporation pressure of the outdoor heat exchanger 420.

The refrigerant introduced into the air conditioning indoor unit 510 from the outdoor unit liquid pipe 450 passes through the first indoor expansion valve 513 and is expanded by the evaporation pressure of the air conditioning heat exchanger 512. The evaporation pressure of the air conditioning heat exchanger 512 may be higher than the evaporation pressure of the outdoor heat exchanger 420.

The refrigerant introduced into the air conditioning heat exchanger 512 may evaporate by absorbing heat of indoor air, and may provide cold air to the indoor space. The air conditioning heat exchanger 512 serves as an evaporator.

The refrigerant discharged from the air conditioning heat exchanger 512 is introduced into the first gas control unit 100 through the air conditioning indoor unit gas pipe 541, and flows along the first low pressure flow path 120 while the flow of refrigerant toward the first high pressure flow path 130 is blocked by the first high pressure check valve 152. The refrigerant flowing along the first low pressure flow path 120 passes through the low pressure expansion valve 160 and is expanded up to the evaporation pressure of the outdoor heat exchanger 420.

The high pressure refrigerant exists in the converging flow path 330 side of the first low pressure check valve 151, and the low pressure refrigerant exists in the first connection flow path 110 side, so that the flow of refrigerant toward the converging flow path 330 from the first low pressure flow path 120 is blocked. Accordingly, the refrigerant which is introduced into the first low pressure flow path 120 and passed through the low pressure expansion valve 160 to be expanded is introduced into the second pipe 320 through the first connection flow path 110.

The refrigerant, which is introduced into the second pipe 320, passes through the second combination expansion valve 323 and flows without a pressure drop, passes through the second pipe check valve 325 and flows into the first pipe 30, and mixed with the refrigerant expanded while passing through the combination expansion valve 313 to be introduced into the outdoor unit liquid pipe 450.

The refrigerant introduced into the outdoor unit liquid pipe 450 passes through the outdoor heat exchanger 420, heat exchanges with outdoor air, and is evaporated. The outdoor heat exchanger 420 serves as an evaporator.

The refrigerant discharged from the outdoor heat exchanger 420 is guided to the accumulator 415 by the four-way valve 430, and the vapor refrigerant is supplied to the compressor by the accumulator 415.

Referring to FIGS. 5 and 7, the valve control of the controller 60 and the flow of the refrigerant during the heating operation of the air conditioning indoor unit 510 and the defrosting operation of the showcase indoor unit 520 will be described.

The controller 60 controls the four-way valve 430 and connects the outlet flow path (or oil separator 470) of the compressor 410 to the outdoor unit gas pipe 440, and connects the inlet flow path (or the accumulator 415) of the compressor 410 to the outdoor heat exchanger 420.

The controller 60 opens the first and second high pressure solenoid valves 142 and 242 and closes the first and second connection solenoid valves 141 and 241.

The controller 60 adjusts the opening degree of the first combination expansion valve 313 to expand the refrigerant introduced into the first pipe 30 from the indoor unit liquid pipe 550 by the evaporation pressure of the outdoor heat exchanger 420. The controller 60 completely opens the first and second indoor expansion valves 513 and 523 so that the refrigerant discharged from the air conditioning heat exchanger 512 and the showcase heat exchanger 522 can flow to the indoor unit liquid pipe 550 without a pressure drop.

The refrigerant compressed in a vapor state of high temperature and high pressure by the compressor 410 is guided to the outdoor unit gas pipe 440 by the four-way valve 430 and flows into the converging flow path 330 of the combination unit 10. The refrigerant introduced into the converging flow path 330 flows into the air conditioning indoor unit gas pipe 541 and the showcase indoor unit gas pipe 542 respectively along the first and second high pressure flow paths 130 and 230 by the first and second low pressure check valves 151 and 251.

In the refrigerant flowing along the first and second high pressure flow paths 130 and 230, as the first and second connection solenoid valves 141 and 241 are closed, the flow toward the second pipe 320 is blocked.

The refrigerant introduced into the air conditioning indoor unit gas pipe 541 evaporates while passing through the air conditioning heat exchanger 512, and emits heat to the indoor space. The refrigerant introduced into the showcase indoor unit gas pipe 542 evaporates while passing through the showcase heat exchanger 522 and emits heat to remove the frost formed in the showcase heat exchanger 522. The air conditioning heat exchanger 512 and the showcase heat exchanger 522 serve as a condenser.

The refrigerants discharged from the air conditioning heat exchanger 512 and the showcase heat exchanger 522 pass through the first and second indoor expansion valves 513 and 523, respectively, and flow into the indoor unit liquid pipe 550 without a pressure drop, and flow toward the first pipe 30 of the combination unit 10.

The refrigerant introduced from the indoor unit liquid pipe 550 to the first pipe 30 passes through the first combination expansion valve 313, is expanded by the evaporation pressure of the outdoor heat exchanger 420, and flows into the outdoor unit liquid pipe 450.

The refrigerant introduced into the outdoor unit liquid pipe 450 flows into the outdoor heat exchanger 420, and absorbs heat from the outdoor air to evaporate. The outdoor heat exchanger 420 serves as an evaporator.

The refrigerant discharged from the outdoor heat exchanger 420 is guided to the inlet flow path of the compressor 410 by the four-way valve 430, and is supplied to the compressor 410 in a vapor state by the accumulator 415.

Referring to FIGS. 6 and 7, the valve control of the controller 60 and the flow of the refrigerant during the defrost operation of the outdoor heat exchanger 420 and the refrigeration operation of the showcase indoor unit 520 will be described.

In a season requiring heating, in the heating operation of the air conditioning indoor unit 510, the outdoor heat exchanger 420 may serve as an evaporator to form frost. In this case, the high temperature and high pressure refrigerant discharged from the compressor 410 may be supplied to the outdoor heat exchanger 420 to operate the outdoor heat exchanger 420 as a condenser. If the air conditioning indoor unit 510 is operated, despite the season that requires heating, the air conditioning heat exchanger 512 serves as an evaporator to supply cold air to the indoor space, so that the operation of the air conditioning indoor unit 510 can be stopped.

Meanwhile, in the defrosting operation of the outdoor heat exchanger 420, the showcase may store food and need to be maintained at a low temperature, and the showcase indoor unit 520 may be operated in the refrigeration operation.

The defrosting operation of the outdoor heat exchanger 420 may be regarded as an operation stop of the air conditioning indoor unit 510 from the indoor unit perspective. Therefore, the defrosting operation of the outdoor heat exchanger 420 and the refrigeration operation of the showcase indoor unit 520 may be regarded as the operation stop of the air conditioning indoor unit 510 and the refrigeration operation of the showcase indoor unit 520.

In the defrosting operation of the outdoor heat exchanger 420 and the refrigeration operation of the showcase indoor unit 520, the valve control and the refrigerant flow are similar to the cooling operation of the air conditioning indoor unit 510 and the refrigeration operation of the showcase indoor unit 520 shown in FIG. 3. Therefore, a difference between the cooling operation of the air conditioning indoor unit 510 and the refrigeration operation of the showcase indoor unit 520 will be mainly described.

The controller 60 closes the first indoor expansion valve 513, unlike the cooling operation of the air conditioning indoor unit 510 and the refrigeration operation of the showcase indoor unit 520.

The refrigerant flow in the outdoor unit 40 and the first pipe 30 is the same as in the cooling operation of the air conditioning indoor unit 510 and the refrigeration operation of the showcase indoor unit 520.

The refrigerant introduced into the indoor unit liquid pipe 550 from the first pipe 30 flows into the showcase indoor unit 520, as the first indoor expansion valve 513 is closed.

The refrigerant introduced into the showcase indoor unit 520 passes through the second indoor expansion valve 523 and is expanded by the evaporation pressure of the showcase heat exchanger 522, passes through the showcase heat exchanger 522, and provides cold air to the showcase and is evaporated. The showcase heat exchanger 522 serves as an evaporator.

The refrigerant discharged from the showcase heat exchanger 522 flows into the second gas control unit 200 through the showcase indoor unit gas pipe 542, and flows along the second low pressure flow path 220 while the flow toward the second high pressure flow path 230 is blocked by the second high pressure check valve 252.

The refrigerant flowing along the second low pressure flow path 220 is introduced into the outdoor unit gas pipe 440 through the converging flow path 330.

The refrigerant flowing along the second low pressure flow path 220 may be introduced into the second pipe 320, but the high pressure refrigerant may exist in the end of the first pipe 30 side of the second pipe check valve 325, so that the flow toward the first pipe 30 may be blocked.

According to the air conditioner of the present disclosure, there are one or more of the following effects.

First, the air conditioner of the present disclosure includes a combination unit for connecting the air conditioning indoor unit for controlling the temperature of the indoor unit and the showcase indoor unit for supplying cold air to the showcase with the outdoor unit, and the combination unit includes a first gas control unit which is connected to the air conditioning indoor unit gas pipe, a second gas control unit which is connected to the showcase indoor unit gas pipe, a first pipe which connects the outdoor unit liquid pipe and the indoor unit liquid pipe, and a second pipe which connects the first pipe and the second gas control unit, so that the air conditioning indoor unit for cooling and heating operation and the showcase indoor unit for refrigeration operation can use a single outdoor unit.

Second, the outdoor unit gas pipe can be connected to the compressor by a four-way valve, the first gas control unit connects the outdoor unit gas pipe and the air conditioning indoor unit, the air conditioning indoor unit and the showcase indoor unit are connected through the indoor unit liquid pipe, the showcase indoor unit is connected to the second gas control unit, the second gas control unit is connected to the first pipe through the second pipe, and the first pipe is connected to the outdoor unit liquid pipe, so that during the heating operation of the air conditioning indoor unit, the heat emitted from the air conditioning indoor unit to the room can be utilized as the heat of condensation of the showcase indoor unit, thereby zeroing the energy consumption for heating.

Third, the outdoor heat exchanger can be connected to the compressor by a four-way valve, the outdoor unit liquid pipe connected to the outdoor heat exchanger and the indoor unit liquid pipe connected to the air conditioning indoor unit and the showcase indoor unit are connected through the first pipe, the air conditioning indoor unit is connected to the outdoor unit gas pipe by the first gas control unit, and the showcase indoor unit is connected to the outdoor unit gas pipe by a second gas control unit, so that during the cooling operation of the air conditioning indoor unit, the room having a relatively high temperature can be cooled by the air conditioner, and the showcase having a relatively low temperature can be refrigerated by using the showcase indoor unit, thereby preventing overload of the air conditioning indoor unit, and performing cooling and refrigeration with optimum performance.

Although the exemplary embodiments of the present disclosure have been disclosed for illustrative purposes, those skilled in the art will appreciate that various modifications, additions and substitutions are possible, without departing from the scope and spirit of the invention as disclosed in the accompanying claims. Accordingly, the scope of the present disclosure is not construed as being limited to the described embodiments but is defined by the appended claims as well as equivalents thereto.

What is claimed is:

1. An air conditioner, comprising:
    an outdoor unit comprising a compressor which compresses a refrigerant, an outdoor heat exchanger which exchanges heat between outdoor air and the refrigerant, an outdoor unit gas pipe which is connected to the compressor, an outdoor unit liquid pipe which is connected to the outdoor heat exchanger, and a four-way valve which selectively guides the refrigerant discharged from the compressor to the outdoor heat exchanger or the outdoor unit gas pipe;
    an indoor unit comprising an air conditioning indoor unit which controls a temperature of a room, a showcase indoor unit which is disposed inside the room and supplies cold air to a showcase having a storage compartment therein, an air conditioning indoor unit gas pipe which is connected to one end of the air conditioning indoor unit, a showcase indoor unit gas pipe which is connected to one end of the showcase indoor unit, and an indoor unit liquid pipe which is connected to the other ends of the air conditioning indoor unit and the showcase indoor unit; and
    a combination unit which is disposed between the outdoor unit and the indoor unit and connects the outdoor unit and the indoor unit, wherein the combination unit comprises a first gas control unit which is connected to the air conditioning indoor unit gas pipe, a second gas control unit which is connected to the showcase indoor unit gas pipe, a first pipe which connects the outdoor unit liquid pipe and the indoor unit liquid pipe, and a second pipe which connects the first pipe and the second gas control unit, wherein the first gas control unit and the second gas control unit are converged to be connected to the outdoor unit gas pipe, wherein the second pipe connects the first pipe with the first gas control unit and the second gas control unit, wherein the first gas control unit comprises:
    a first high pressure flow path through which the refrigerant discharged from the compressor flows in a heating operation of the air conditioning indoor unit;
    a first low pressure flow path which is connected in parallel with the first high pressure flow path and through which the refrigerant discharged from the air conditioning indoor unit flows in a cooling operation of the air conditioning indoor unit; and
    a first connection flow path that connects the first low pressure flow path and the second pipe, wherein the second gas control unit comprises:
        a second high pressure flow path through which the refrigerant discharged from the compressor flows in a defrosting operation of the showcase indoor unit;
        a second low pressure flow path which is connected in parallel with the second high pressure flow path, and through which the refrigerant discharged from the showcase indoor unit flows in a refrigeration operation of the showcase indoor unit; and
        a second connection flow path that connects the second low pressure flow path and the second pipe, wherein the combination unit comprises a converging flow path which is extended from the first low pressure flow path and the second low pressure flow path respectively, and converged with each other to be connected to the outdoor unit gas pipe.

2. The air conditioner of claim 1, wherein the air conditioning indoor unit comprises:
    an air conditioning heat exchanger which exchanges heat between an indoor air and the refrigerant; and
    a first indoor expansion valve which is disposed between the air conditioning heat exchanger and the indoor unit liquid pipe and expands the refrigerant introduced into the air conditioning heat exchanger during a cooling operation;
    wherein the showcase indoor unit comprises:
        a showcase heat exchanger which exchanges heat between the air in the storage compartment and the refrigerant; and
        a second indoor expansion valve which expands the refrigerant flowing into the showcase heat exchanger during a refrigeration operation.

3. The air conditioner of claim 1, wherein the four-way valve connects an outlet flow path of the compressor and the outdoor heat exchanger, and connects an inlet flow path of the compressor and the outdoor unit gas pipe, in the cooling operation of the air conditioning indoor unit and the refrigeration operation of the showcase indoor unit, and connects the outlet flow path of the compressor and the outdoor unit gas pipe, and connects the inlet flow path of the compressor and the outdoor heat exchanger, in a heating operation of the air conditioning indoor unit and/or a defrost operation of the showcase indoor unit.

4. The air conditioner of claim 1, wherein the combination unit comprises:

a first pipe check valve which is installed in the first pipe, and blocks a flow of the refrigerant introduced from the indoor unit liquid pipe; and a first combination expansion valve which is installed in the first pipe, connected in parallel with the first pipe check valve, and expands the refrigerant introduced from the indoor unit liquid pipe.

5. The air conditioner of claim 4, wherein the first combination expansion valve is closed, in the cooling operation of the air conditioning indoor unit and the refrigeration operation of the showcase indoor unit, and expands the refrigerant flowing through the first pipe by adjusting an opening degree, in a defrost operation of the air conditioning indoor unit and/or a defrost operation of the showcase indoor unit.

6. The air conditioner of claim 4, wherein the combination unit comprises:

a second combination expansion valve which is installed in the second pipe and expands the refrigerant introduced into the second pipe from the second gas control unit; and a second pipe check valve which is installed in the second pipe and blocks a flow of the refrigerant from the outdoor unit liquid pipe toward the second pipe.

7. The air conditioner of claim 1, wherein the first gas control unit comprises:

a high pressure solenoid valve which is installed in the high pressure flow path and controls a flow of the refrigerant flowing through the high pressure flow path;

a low pressure expansion valve which is installed in the first low pressure flow path and expands the refrigerant flowing through the first low pressure flow path; and a first low pressure check valve which is installed in the first low pressure flow path and blocks a flow from the converging flow path toward the first low pressure flow path, wherein the second gas control unit comprises a second low pressure check valve which is installed in the second low pressure flow path and blocks a refrigerant flow from the converging flow path toward the second low pressure flow path.

8. The air conditioner of claim 7, wherein the high pressure solenoid valve is opened in the heating operation of the air conditioning indoor unit.

9. The air conditioner of claim 7, wherein the first gas control unit comprises a high pressure check valve which is installed in the high pressure flow path and blocks a flow from the air conditioning indoor unit gas pipe to the high pressure flow path.

10. The air conditioner of claim 1, wherein the first gas control unit comprises:

a first high pressure solenoid valve which is installed in the first high pressure flow path and controls a flow of the refrigerant flowing through the first high pressure flow path;

a low pressure expansion valve which is installed in the first low pressure flow path and expands a refrigerant flowing through the first low pressure flow path;

a first low pressure check valve which is installed in the first low pressure flow path and blocks a flow from the converging flow path toward the first low pressure flow path; and a first connection solenoid valve which is installed in the first connection flow path and controls a flow of the refrigerant flowing through the first connection flow path, wherein the second gas control unit comprises:

a second high pressure solenoid valve which is installed in the second high pressure flow path and controls a flow of the refrigerant flowing through the second high pressure flow path;

a second low pressure check valve which is installed in the second low pressure flow path and blocks a refrigerant flow from the converging flow path toward the second low pressure flow path; and a second connection solenoid valve which is installed in the second connection flow path and controls a flow of the refrigerant flowing through the second connection flow path.

11. The air conditioner of claim 10, wherein the first high pressure solenoid valve is opened in the heating operation of the air conditioning indoor unit, and is closed in the cooling operation of the air conditioning indoor unit the defrost operation of the showcase indoor unit, and the second high pressure solenoid valve is opened in the defrosting operation of the showcase indoor unit, and is closed in the refrigeration operation of the showcase indoor unit and the heating operation of the air conditioning indoor unit.

12. The air conditioner of claim 10, wherein the first connection solenoid valve is closed in the heating operation of the air conditioning indoor unit, and is opened in the cooling operation of the air conditioning indoor unit and the defrosting operation of the showcase indoor unit, wherein the second connection solenoid valve is closed in the defrosting operation of the showcase indoor unit, and is opened in the refrigeration operation of the showcase indoor unit and the heating operation of the air conditioning indoor unit.

13. The air conditioner of claim 10, wherein the first gas control unit comprises a first high pressure check valve which is installed in the first high pressure flow path and blocks a flow from the air conditioning indoor unit gas pipe toward the first high pressure flow path, and the second gas control unit comprises a second high pressure check valve which is installed in the second high pressure flow path and blocks a flow from the showcase indoor unit gas pipe to the second high pressure flow path.

14. An air conditioner, comprising:

an outdoor unit comprising a compressor which compresses a refrigerant, an outdoor heat exchanger which exchanges heat between outdoor air and the refrigerant, an outdoor unit gas pipe which is connected to the compressor, an outdoor unit liquid pipe which is connected to the outdoor heat exchanger, and a four-way valve which selectively guides the refrigerant discharged from the compressor to the outdoor heat exchanger or the outdoor unit gas pipe;

an indoor unit comprising an air conditioning indoor unit which controls a temperature of a room, a showcase indoor unit which is disposed inside the room and supplies cold air to a showcase having a storage compartment therein, an air conditioning indoor unit gas pipe which is connected to one end of the air conditioning indoor unit, a showcase indoor unit gas pipe which is connected to one end of the showcase indoor unit, and an indoor unit liquid pipe which is connected to the other ends of the air conditioning indoor unit and the showcase indoor unit; and a combination unit which is disposed between the outdoor unit and the indoor unit and connects the outdoor unit and the indoor unit, wherein the combination unit comprises a first gas control unit which is connected to the air conditioning indoor unit gas pipe, a second gas control unit which is connected to the showcase indoor unit gas pipe, a first pipe which connects the outdoor unit liquid pipe and the indoor unit liquid pipe, and a second pipe which connects the first pipe and the second gas control unit, wherein the first gas control unit and the second gas control unit are converged to be connected to the outdoor unit gas pipe, wherein the first gas control unit comprises:

a high pressure flow path through which the refrigerant discharged from the compressor flows in a heating operation of the air conditioning indoor unit; and a first low pressure flow path which is connected in parallel with the high pressure flow path, and flows the refrigerant discharged from the air conditioning indoor unit in a cooling operation of the air conditioning indoor unit, wherein the second gas control unit comprises:

a second low pressure flow path through which the refrigerant discharged from the showcase indoor unit flows in a refrigeration operation of the showcase indoor unit; and a connection flow path that connects the second low pressure flow path and the second pipe, wherein the combination unit comprises a converging flow path which is extended from the first low pressure flow path and the second low pressure flow path respectively, and converged with each other to be connected to the outdoor unit gas pipe, wherein the first gas control unit further comprises:

a high pressure solenoid valve which is installed in the high pressure flow path and controls a flow of the refrigerant flowing through the high pressure flow path;

a low pressure expansion valve which is installed in the first low pressure flow path and expands the refrigerant flowing through the first low pressure flow path; and a first low pressure check valve which is installed in the first low pressure flow path and blocks a flow from the converging flow path toward the first low pressure flow path, and wherein the second gas control unit comprises a second low pressure check valve which is installed in the second low pressure flow path and blocks a refrigerant flow from the converging flow path toward the second low pressure flow path.

15. The air conditioner of claim 14, wherein the high pressure solenoid valve is opened in the heating operation of the air conditioning indoor unit.

16. The air conditioner of claim 14, wherein the first gas control unit comprises a high pressure check valve which is installed in the high pressure flow path and blocks a flow from the air conditioning indoor unit gas pipe to the high pressure flow path.

* * * * *